(12) United States Patent
Lenz

(10) Patent No.: US 6,190,711 B1
(45) Date of Patent: Feb. 20, 2001

(54) PACKAGED COOKED GROUND MEAT PRODUCTS AND METHODS OF MAKING THE SAME

(76) Inventor: William P. Lenz, 192 Suquamish Way, La Conner, WA (US) 98257

(*) Notice: Under 35 U.S.C. 154(b), the term of this patent shall be extended for 0 days.

(21) Appl. No.: 09/356,939

(22) Filed: Jul. 19, 1999

Related U.S. Application Data

(60) Provisional application No. 60/095,731, filed on Aug. 7, 1998.

(51) Int. Cl.[7] ................................................. B65D 85/00
(52) U.S. Cl. ........................ 426/129; 426/143; 426/144; 426/646; 426/656; 426/513
(58) Field of Search ................................... 429/129, 144, 429/143, 646, 656, 412, 513

(56) References Cited

U.S. PATENT DOCUMENTS

| | | |
|---|---|---|
| 3,552,982 | 1/1971 | Savidge . |
| 3,607,312 | 9/1971 | Ready . |
| 3,887,964 * | 6/1975 | Richards .................................. 17/32 |
| 3,900,919 * | 8/1975 | Lekan et al. ............................. 17/26 |
| 3,912,823 | 10/1975 | Kane . |
| 3,962,751 * | 6/1976 | Wagner ............................. 426/144 X |
| 3,966,980 | 6/1976 | McGuckian . |
| 4,182,003 * | 1/1980 | Lamartino et al. ...................... 17/32 |
| 4,218,486 | 8/1980 | Bieler et al. . |
| 4,356,595 * | 11/1982 | Sandberg et al. ................ 426/513 X |
| 4,372,008 * | 2/1983 | Sandberg ................................ 17/32 |
| 4,411,919 | 10/1983 | Thompson . |
| 4,418,446 * | 12/1983 | Sandberg et al. ................ 426/513 X |
| 4,556,571 * | 12/1985 | Swartz et al. .................... 426/533 X |
| 4,606,922 | 8/1986 | Schirmer . |
| 4,820,536 | 4/1989 | Lippincott et al. . |
| 4,821,376 * | 4/1989 | Sandberg ................................ 17/32 |
| 4,915,963 | 4/1990 | Lustig et al. . |
| 5,047,253 | 9/1991 | Juhl et al. . |
| 5,945,152 * | 8/1999 | Purser ................................. 426/646 |

OTHER PUBLICATIONS

1991 Packaging Digest article entitled Updated Heat–In–Bags Serve Foodservice Well.
1995 Journal of Food Safety article entitled Outgrowth of Clostridium Perfringens Spores On Cook–In–Bag Beef Products.
1991 General Mills notice regarding textured soy concentrates as additives to patties.
1981 Journal of Food Science article entitled Effect Of Soya Level And Storage Time On The Quality Characteristics Of Ground Beef Patties.
1985 Journal of Food Science article entitled Sensory Characteristics, Shear Values And Cooking Properties Of Ground Beef Patties Extended With Iron And Zinc–Fortified Soy Isolate, Concentrate, Or Flour.
1992 Meat Processing article reviewing use of encapsulated salt in meat products.
1991 Food Processing article discussing us of encapsulated salt in McDonald's McLean Deluxe hamburgers.
1992 Journal of Food Science article entitled Properties Of Low–Fat Ground Beef Containing Potassium Lactate During Aerobic Refrigerated Storage.
1988 General Foods product release entitled Frozen Food Age.
1993 Journal of Food Science article disclosing the addition of phosphate to hamburger.
1976 Quick Frozen Foods article disclosing the use of soy protein in ground beef products.
1987 Journal of Food Science & Technology disclosing use of soy protein isolate in ground meat products.
1984 German article relating to the application of soy flour to meat products.
1984 article from Journal of Japanese Society of Food Science & Technology discussing soybean polysaccharide in meat–fat mixtures.
1976 article from Quick Frozen Foods disclosing use of soy protein in ground meat systems.
Definition of beef patties used by governmental regulatory agencies.
Formax, Inc. brochure disclosing commercially available perforator used to form indentations on meat products.
Red Arrow Products Co., Inc. disclosing contents of Grillin Type GC seasoning.
Red Arrow Products Co., Inc. disclosing contents of Grilling Type CN seasoning.

* cited by examiner

*Primary Examiner*—Milton Cano
(74) *Attorney, Agent, or Firm*—Michael R. Schacht; Hughes & Schacht, P.S.

(57) ABSTRACT

Precooked, packaged ground meat products and methods of making such products. The product comprises ground meat and at least one moisture-absorbing additive. The formulated meat mixture is formed into a raw ground meat portion. Perforations are formed in the raw ground meat portion. The perforated raw ground meat portion is sealed within a closed envelope and cooked. The moisture-absorbing additive and perforations control the purge (water and other juices) discharged by the meat during cooking. The moisture-absorbing additive absorbs some of this purge; the perforations trap much of the remaining purge. The resulting product is thus without large amounts of free purge within the package and may be broken apart easily into cooked ground meat upon removal from the package. The raw meat should be frozen and maintained frozen until cooking to maintain the grain structure and perforations during handling.

29 Claims, 7 Drawing Sheets

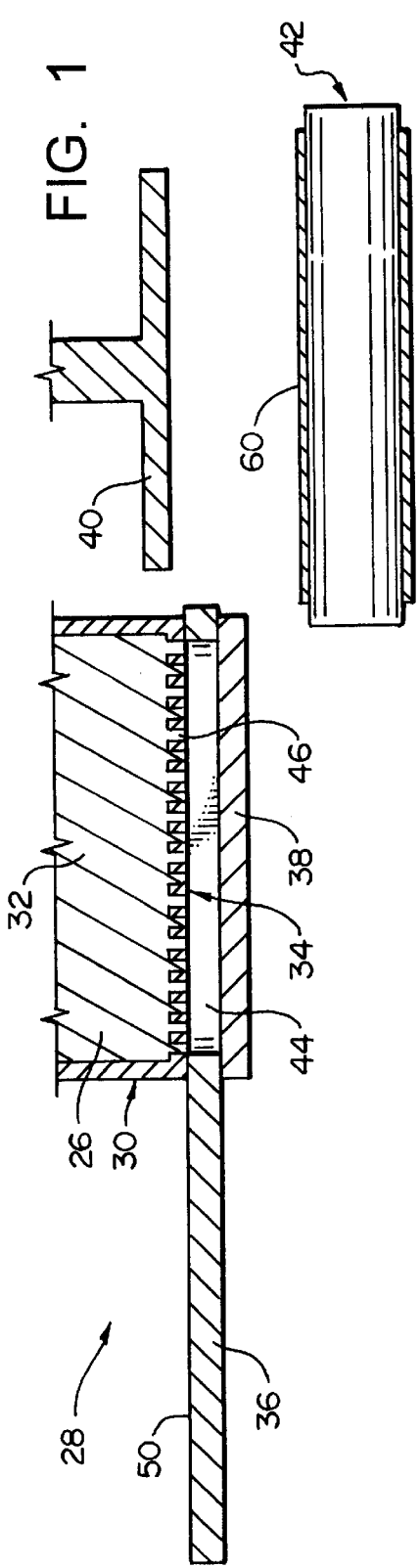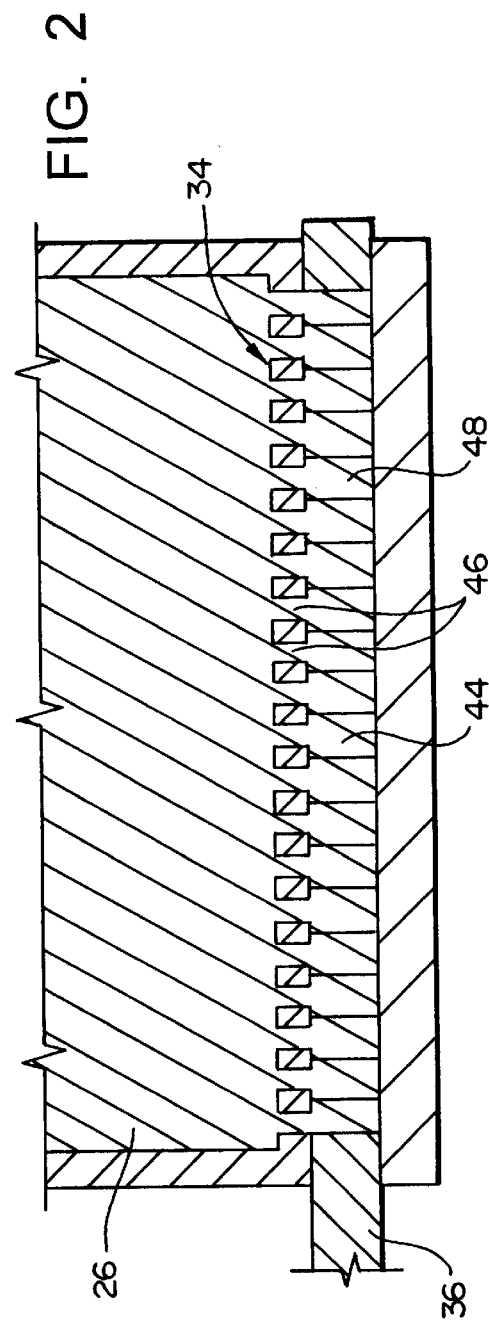

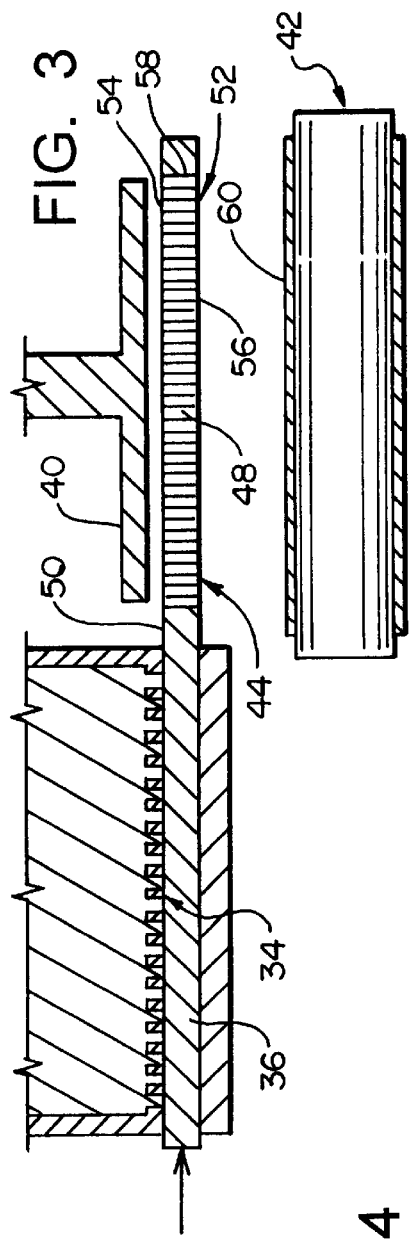
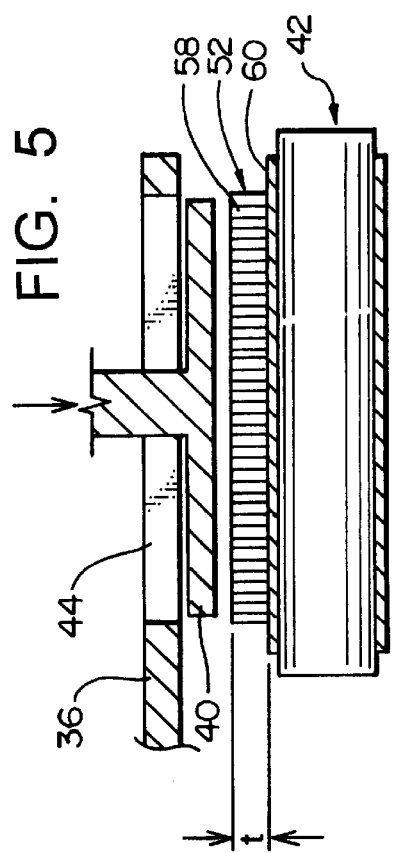
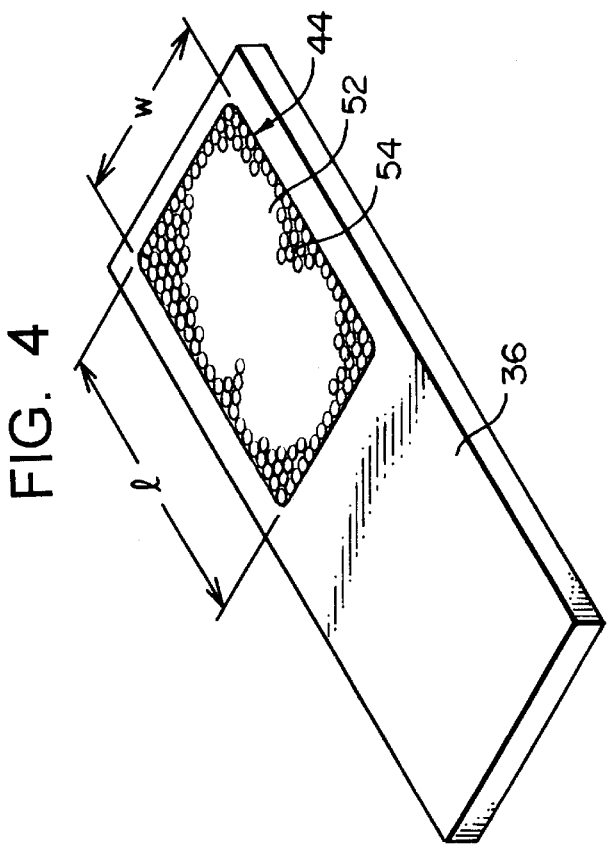

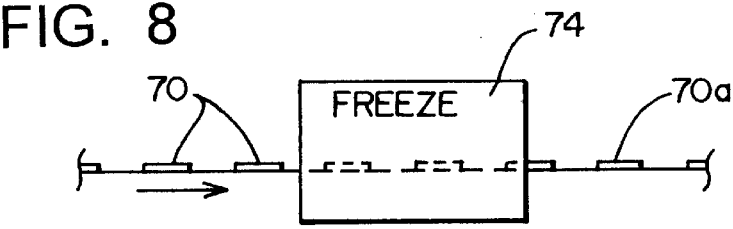
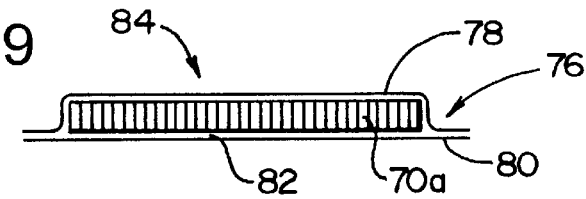
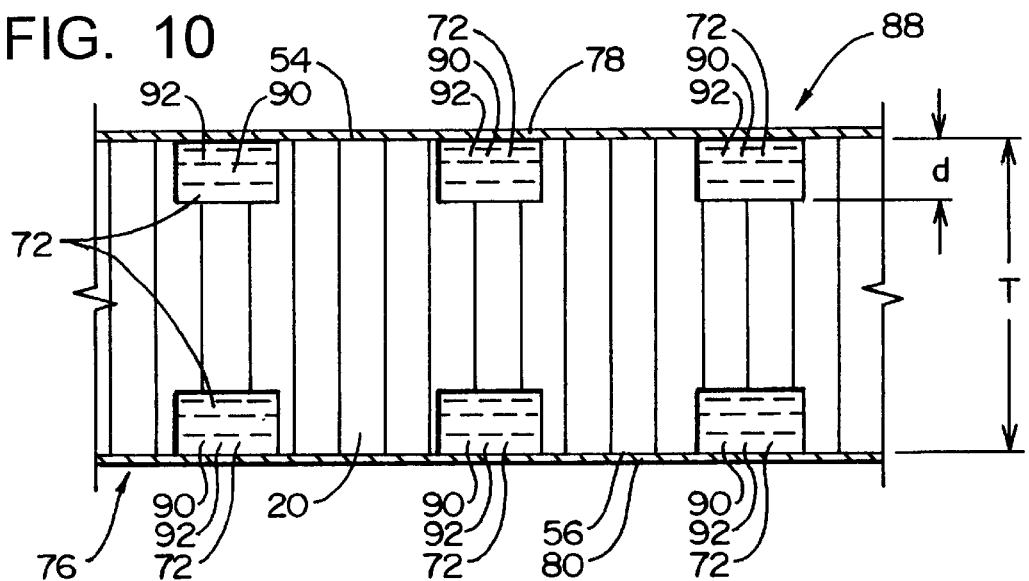
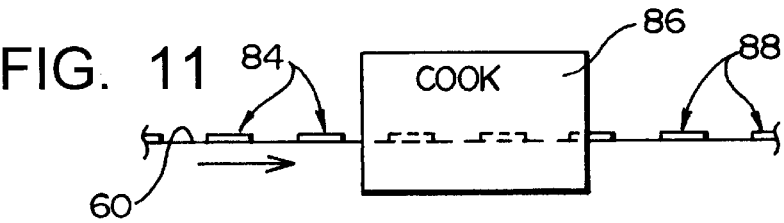
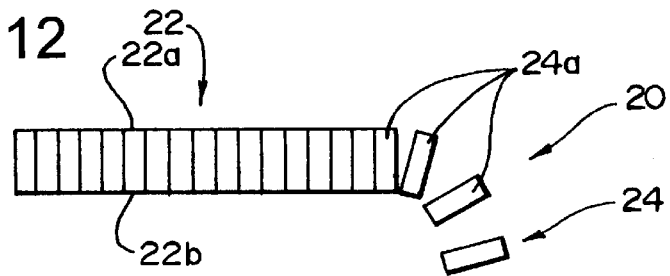

PACKAGED COOKED GROUND MEAT PRODUCTS AND METHODS OF MAKING THE SAME

RELATED APPLICATIONS

This application claims priority of U.S. Provisional Application Ser. No. 60/095,731 filed Aug. 7, 1998.

FIELD OF THE INVENTION

The present invention relates to ground meat products and, more particularly, to ground meat products for use as an ingredient that are cooked prior to sale to the consumer.

BACKGROUND OF THE INVENTION

The present invention relates to methods and products that make the use of certain forms of ground meat more convenient for the food preparer. In the context of this application, the term "ground meat" includes any meat, such as beef, pork, chicken, turkey, and the like, or mixtures thereof, that is mechanically processed into small pieces using methods such as grinding and/or chopping. The term "food preparer" refers to the person who actually prepares the meat for consumption at mealtime.

Ground meat products are sold to consumers in numerous forms through both institutional and retail channels. The present invention has primary significance in the context of ground meat that is sold through retail channels for preparation in the home, but may also be of significance in institutional channels where food is prepared outside the home, as will be discussed below.

Most ground meat products sold through retail channels are sold to the end user in bulk, either frozen or unfrozen, in an uncooked form. The end user will thaw the meat, if necessary, season the meat, if desired, form the meat into patties, meatballs, or the like, if desired, and cook the meat.

One common form of prepared ground meat is simply to cook the raw bulk ground meat so that the meat takes the form of small chunks or pieces rather than larger balls or patties. This form of prepared ground meat will be referred to herein as cooked ground meat.

Cooked ground meat is often used as an ingredient in recipes for dishes such as spaghetti sauces, lasagnas, tacos, sloppy joes, and the like. To obtain cooked ground meat for use as an ingredient, the raw ground meat should be cooked and drained to eliminate unwanted moisture such as water and other juices.

The Applicant has recognized the need for a packaged, cooked, ground meat product that can be used directly from the package without cooking. This product should be of appropriate texture and flavor that it can be eaten directly from the package. The product should also be easy to remove from the package, not be unacceptably greasy, moist, or dry to the touch, and be appropriate for use as an ingredient in recipes.

RELATED ART

The Applicant is aware of a number of products and prior art references in which ground meat is sold through retail channels in forms other than in bulk, uncooked form.

Meat is often sold in cooked or uncooked patties appropriate for preparing hamburgers.

The Applicant is also aware of the following references that are relevant to the present application:

U.S. Pat. No. 3,607,312 to Ready and U.S. Pat. No. 3,966,980 to McGuckian discloses cooking foods in a vacuum-sealed package using hot water. The foods can be raw or partly cooked before packaging. Neither of these patents discloses, teaches, or suggests a method of preparation that obtains a cooked ground meat product appropriate for use as an ingredient.

U.S. Pat. No. 3,552,982 to Savidge discloses a system for packaging food products in which the food products are vacuum packed and cooked using steam. Nothing in this patent discloses, teaches, or suggests a precooked, packaged, ground meat product.

The Applicant is also aware of a number of references, including articles, notices, and product announcements, related to meat products. Based on the Applicant's reading of the Abstracts of these references, none of these references disclose, teach, or suggest a precooked, packaged, ground meat product.

A 1991 Packaging Digest article entitled UPDATED HEAT-IN-BAGS SERVE FOODSERVICE WELL discloses a packaged cooked ground beef product in which the meat is cooked and then hot-filled in a vertical form-fill-seal.

A 1995 Journal of Food Safety article entitled OUTGROWTH OF CLOSTRIDIUM PERFRINGENS SPORES IN COOK-IN-BAG BEEF PRODUCTS discloses methods of inhibiting certain bacterial growth in cook-in-bag ground beef products.

A 1991 General Mills notice indicates that textured soy concentrates added to patties provides high yields with sensory acceptance. The soy proteins purportedly offer a solution to a proposed regulatory increase in cooking temperatures of meat patties.

A 1981 Journal of Food Science article entitled EFFECT OF SOYA LEVEL AND STORAGE TIME ON THE QUALITY CHARACTERISTICS OF GROUND BEEF PATTIES discloses a study that looked at the effect of soy and storage time on ground beef patties.

A 1985 Journal of Food Science article entitled SENSORY CHARACTERISTICS, SHEAR VALUES AND COOKING PROPERTIES OF GROUND BEEF PATTIES EXTENDED WITH IRON AND ZINC-FORTIFIED SOY ISOLATE, CONCENTRATE, OR FLOUR discusses the effects of soy proteins on such factors as cooking yields, rancidity, and flavor.

A 1992 Meat Processing article reviews the use of encapsulated salt in meat products.

A 1991 Food Processing article discusses the use of encapsulated salt in McDonald's McLean Deluxe hamburger.

A 1993 Food Product Design article discusses the benefits of adding encapsulated salt to low-fat beef products.

A 1992 Journal of Food Science article entitled PROPERTIES OF LOW-FAT GROUND BEEF CONTAINING POTASSIUM LACTATE DURING AEROBIC REFRIGERATED STORAGE compares low-fat beef patties with certain additives to low-fat beef products without additives.

While all of these references generally relate to the preparation of meat and some relate the use of soy additives or to precooked, packaged meat products, none of these references, either alone or in combination, teach or suggest a packaged, cooked, ground meat product that can be eaten directly from the package and/or used as an ingredient in a recipe.

SUMMARY OF THE INVENTION

The present invention is a cooked ground meat product in which the product is sold in a packaged portion that may be easily broken apart into cooked ground meat while still in the package or upon removal from the package.

The ground meat is ground beef, pork, chicken, turkey, or the like that is mixed with additives such as a moisture-absorbing additive in addition to spices, flavorings, and fillers. The moisture-absorbing additive is preferably a soy protein capable of absorbing liquids such as water and other juices purged from the meat during cooking.

The Applicant has developed a commercially cooked ground meat product that is formed by a preferred process involving a number of processing steps. That process, the raw materials used in that process, and the resulting cooked ground meat product are described herein in detail.

In addition, however, the Applicant has recognized that not every step or raw material used to obtain the preferred cooked ground meat product described herein is necessary to obtain an acceptable, if not preferred, cooked ground meat product embodying the principles of the present invention. Minor variations on the preferred form of the invention described herein, such as omitted processing steps and/or using modified raw material proportions, are acceptable. The cooked ground meat portion is formed and cooked in a manner that allows it to be easily broken apart. As described in copending provisional patent application Ser. No. 60/095,731, the cooked ground meat portion may be formed from a raw ground meat portion having a grain structure that allows it to be easily broken apart.

A preferred method of forming this grain structure is referred to as the Tender-Form® process. The Tender-Form process results in a cooked ground meat portion having a large number of axially or vertically aligned, cylindrical sub-portions being formed into a raw patty or larger portion.

As an alternative to the use of the Tender-Form process, the Applicant has discovered that another acceptable cooked ground meat portion can be formed by using a standard fill process. The standard fill process yields an uncooked ground meat portion comprised of intertwined "extrusions" of meat that may not be vertically aligned. These extrusions are elongate, continuous pieces of meat having a circular cross-section such as is conventionally discharged from a meat grinder. At least portions of these extrusions may be horizontally arranged when they are formed into the raw patty.

The Applicant has discovered that certain processing parameters help ensure the formation of an acceptable cooked ground meat portion formed by the standard fill process. First, an acceptable cooked ground meat portion can be formed if the thickness of the standard fill raw patty is kept below a predetermined maximum thickness. Second, stamping or pressing the packaged, hot ground meat portion after cooking and prior to cooling with a tenderizer comprising a plurality of discrete pressure points increases the likelihood that the cooked ground meat portion can be broken apart into acceptable ground meat.

After the raw patty has been formed using either the Tender-Form fill process or the standard fill process, the raw ground meat portion is then perforated, frozen, vacuum packaged within a cookable envelope, cooked, possibly tenderized, and chilled.

The packaged raw ground meat portion is cooked within the package by an impingement steam cooking process or hot water cooking process or one or more conventional cooking processes. The moisture-absorbing additive absorbs much of the moisture purged during cooking. Much of the moisture not absorbed by the moisture-absorbing additive is trapped by perforations which are applied to both surface sides of the portion. When removed from the envelope, the cooked ground meat portion is thus not unacceptably greasy, wet, or moist.

The raw meat is preferably maintained in at least a semi-frozen state during processing, forming, and perforating. As it is formed into a patty having a structure as described above, ice crystals within the frozen raw meat prevent it from compressing. The formation of ice crystals allows the formed product to be less dense, thereby maintaining the individual identity of the extruded sub-portions that form the raw ground meat portion. The individual sub-portions may thus be easily broken apart when used as an ingredient after cooking in the cookable envelope.

After the perforations have been formed, the raw meat is preferably immediately frozen. Being in a frozen state helps the portion maintain its physical structure during subsequent packaging steps and prior to cooking.

Aspects of the preferred form of the invention may be related to other such aspects. For example, the tenderizing process is probably more important when the standard fill process is used than if the Tender-Form process is used. Accordingly, as will be described in detail below, the manufacture of an acceptable cooked ground meat product requires the balancing of a number of factors.

DESCRIPTION OF THE DRAWINGS

FIG. 1 is a side, elevation, cut-away view of one exemplary system for producing packaged cooked ground meat products according to the principles of the present invention, with other exemplary systems possibly being used in place of this exemplary system;

FIG. 2 is a side, elevation, cut-away view of one exemplary fill process that may be used in the system of FIG. 1;

FIG. 3 is a side, elevation, cut-away view similar to FIG. 1 showing the system of FIG. in a different state;

FIG. 4 is a perspective view of a fill plate that may be used in the system of FIG. 1;

FIG. 5 is an end, elevation, cut-away view of the system of FIG. 1;

FIG. 8 is a side, elevation, somewhat schematic view of a freezing system that may be used in connection with the system of FIG. 1;

FIG. 9 is a side, elevation, cut-away view of a packaged meat product;

FIG. 10 is a close up of a packaged meat product such as that depicted in FIG. 9;

FIG. 11 is a side, elevation, somewhat schematic view of a cooking system that may be used in connection with the system of FIG. 1;

FIG. 12 is a side view of one exemplary cooked ground meat product;

DESCRIPTION OF THE PREFERRED EMBODIMENTS

Figure 6:
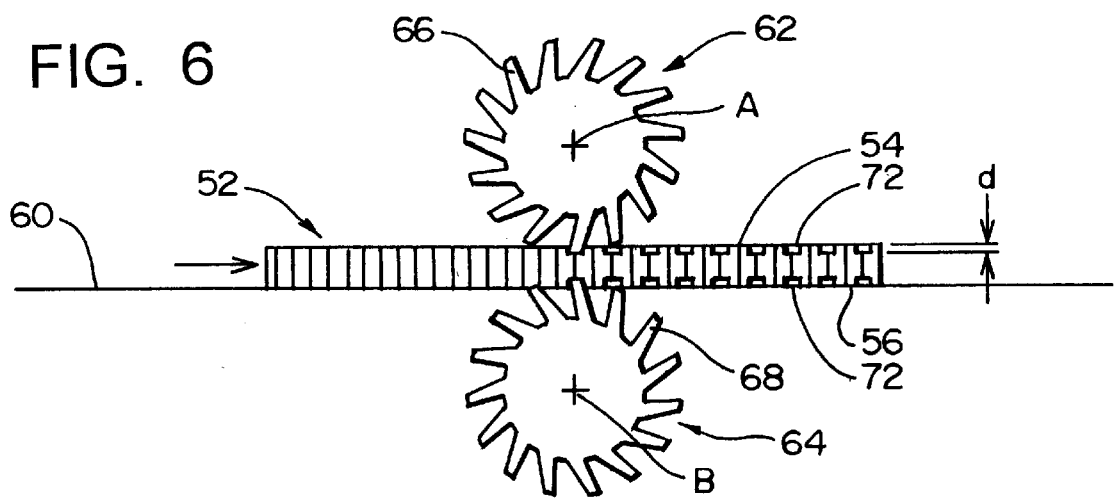
FIG. 6 is a side, elevation view of an optional perforator that may be used with in connection with the exemplary system of FIG. 1.

Referring now to the drawing, depicted at 20 in FIG. 12 is a cooked ground meat product formed in accordance with, and embodying, the principles of the present invention. As shown in FIG. 12, the cooked ground meat product 20 starts out as a cooked ground meat portion 22 and is broken apart by hand or kitchen utensil into cooked ground meat as shown at 24.

The product 20 is primarily intended to be used in the form of cooked ground meat 24 as an ingredient in a food recipe. Nothing prevents the product 20 from being eaten in the form of the cooked ground meat portion 22, however, and the cooked ground meat portion 22 may have significant uses without being broken apart into the cooked ground meat 24.

A fundamental purpose of the cooked ground meat product 20 is to provide the food preparer with a more convenient form of cooked ground meat suitable for use in recipes. When removed from its package, the cooked ground meat product 20 of the present invention breaks apart easily into the cooked ground meat 24, does not have any unpleasant odors, is not unpleasant to the touch such as by being greasy or the like, does not require any further processing before being ingested, and has a pleasant taste when consumed directly from the package.

To obtain the product of the present invention, the cooked ground meat product must be processed using a controlled method or methods as will be described below. In addition, the raw materials from which the cooked ground meat product is manufactured is preferably mixed according to predetermined formulations to satisfy taste, physical structure, and food safety considerations.

In the following discussion, the structure of the cooked ground meat product 20 will first be described. The preferred process of manufacturing the cooked ground meat product 20 and certain variations thereon will then be described in detail. Steps that may be taken to inhibit the growth of chlostridia bacterium will next be discussed. The application will then describe a number of examples of packaging for the meat product 20. Following that will be a description of a number of examples of raw material mixtures or formulations that can be used to obtain different embodiments of the cooked ground meat product 20.

A. Structure of Cooked Ground Meat Product

The cooked ground meat product 20 described above consists of a physical structure and ingredient composition that result in an acceptable product as defined above.

The physical structure of the cooked ground meat product 20 is important to ensure that the product 20 can be easily broken apart into the cooked ground meat 24 that is appropriate for use in recipes. For this purpose, the cooked ground meat 24 must be in the form of discrete small particles that are not bound together and may be broken apart as described above.

The exemplary Tender-Form cooked ground meat product 20 has a physical structure that will be referred to herein as a "grain structure". This grain structure allows the product 20 to be easily broken apart into small quantities by hand or with a cooking utensil such as a fork. The term grain structure is defined herein as a shorthand term for a particular physical structure as described below in this section.

In particular, the term grain structure indicates that the product 20 comprises a plurality of elongate sub-portions, such as those shown by reference character 24*a* in FIG. 12, that are aligned side to side with their ends terminating in two planes forming first and second face surfaces 22*a* and 22*b* of the cooked ground meat portion 22. Application of force along the axes of these sub-portions causes them to separate from each other into discrete pieces. In the following discussion, the term "vertical" refers to the vertical direction in FIGS. 1,2, 3,5, 6, and 8–10 and is in reference to the cooked ground meat product 20; this term does not necessarily correspond to true vertical, but usually will correspond to true vertical during the steps of fabricating the product 20. In this context, the sub-portions 24 are vertically aligned with each other.

The sub-portions 24 are generally cylindrical in overall shape, but other shapes may be employed under other conditions. The exemplary sub-portions 24 of the cooked ground meat portion 22 are preferably approximately ³⁄₃₂" or ⅛" in diameter and are in any event between approximately ¹⁄₁₆" and approximately ¼" in diameter.

Maintaining this grain structure through the steps of manufacturing the cooked ground meat product 20 is important to obtain a product that satisfies many of the objects of the present invention.

The composition of the cooked ground meat product will now be described in further detail. Cooking a ground meat product causes fluids such as water and other juices, called purge, to be discharged from the meat during cooking. The product 20 of the present invention has been cooked in a sealed package to kill pathogens that may be present in the raw meat. The product 20 is left in the sealed package during shipment and sale to maintain its sanitary properties and prolong its shelf life.

Under these conditions, the purge is also sealed within the package and will remain there. If not dealt with in some manner, the purge may collect in relatively large quantities within the package and will be clearly evident when the product is removed from the package. While these purged fluids do not render the product inedible, they can make the product significantly less appetizing if allowed to flow freely within the package.

And if retained within the cooked meat, the purge can provide several benefits. First, the retained purge can make the meat portion 22 more moist when eaten. Retained purge does not affect taste, and the moisture can improve texture or mouth feel.

Second, if not retained in the meat portion 22, the purge may be poured off and wasted; if the purge is retained, there will be little or no yield loss when the meat portion 22 is cooked, unlike conventional methods of cooking ground meat. With conventional cooking methods, sixteen ounces of raw ground meat will yield approximately eleven to twelve ounces of cooked ground meat. With the present invention, twelve ounces of raw ground meat yields approximately twelve ounces of cooked ground meat. The structure of the meat portion 22 thus decreases yield loss.

Accordingly, the present invention employs two mechanisms to control the purge that would otherwise collect within the product packaging during cooking.

The first is a moisture absorbing additive that is mixed throughout the raw ground meat prior to cooking. The moisture absorbing additive absorbs a good portion of the moisture purged from the product during cooking.

The second is the formation of the perforations in at least a portion of the surface of the product; these perforations alter the mechanical structure of the product to contain any purged moisture that is not quickly absorbed by the moisture absorbing additive and encourages re-absorption of the purge by evenly distributing the purge along both surfaces of the product. This unabsorbed fluid will not collect in large quantities within the packaging. At the same time, the perforations are formed in a manner that maintains the grain structure of the product 20; the product 20 thus can still be easily broken apart into cooked ground meat when desired.

Referring initially to the moisture absorbing additive, this additive is distributed throughout the raw meat such that, when the meat is eventually cooked, liquids discharged from the meat are absorbed throughout the product. The primary moisture absorbing additive used by the present invention is preferably a soy protein.

Soy proteins are generally available in the form of soy flour, soy concentrate, and soy isolate. These forms differ from each other primarily in the purity of the soy protein. Soy flour is the least pure, soy isolate is the most pure, and soy concentrate is in the middle in terms of purity of the soy protein.

When used as an additive in meats, the purity of a soy protein can affect the flavor of the meat. The impurities in soy flour and soy concentrate can be tasted if enough soy protein is used. To avoid affecting the flavor of the cooked ground meat product 20, soy concentrates and soy isolates are preferred as additives in the present invention.

A preferred soy concentrate is sold by the Archer Daniels Midland Company under the trade name ARCON-T or alternately ARCON-S. When saturated with fluids, ARCON-T provides a texture similar to that of cooked ground meat. ARCON-S provides a somewhat softer texture. A preferred soy isolate is PRO FAM 646, which is also sold by Archer Daniels Midland. The PRO FAM 646 product has the most moisture absorption and less of an effect on the flavor of the meat portion 22.

Other additives, such as spices and the like, will also absorb fluids. The moisture absorbing capacity of these other additives should therefor be taken into account when determining the quantity of the soy additive that is used.

Conventionally, soy proteins are added to meat products as a filler to extend the meat product. In the conventional situation, the soy protein is hydrated with water to provide additional bulk to the meat product, which increases product yield without unacceptably affecting taste or texture. In the present invention, in contrast, at least part of the added soy protein is not combined with water and is not used as a filler. If hydrated soy is used as a filler in the context of the present invention, additional non-hydrated soy should be added to absorb the natural purge generated by the meat during cooking.

Turning now to the physical structure of the product, small perforations are formed in at least a portion of the surfaces 22a and 22b (FIG. 12) of the cooked ground meat portion 22. These perforations, which are not of a scale that can be seen in FIG. 12, are for the purpose of entrapping purge discharged from the meat during cooking. These perforations should be of sufficient density and depth to contain the moisture purged from the meat during cooking, but should not be so densely formed or deep that they materially disrupt the grain structure of the meat product. Another purpose of these perforations is to allow the portion 22 to be gripped as it is broken apart into the sub-portions 24.

The perforations are formed before the product is cooked and may become distorted by the cooking process. Accordingly, descriptions herein of the physical characteristics of the perforations refer to the characteristics of the perforations before cooking.

B. Manufacturing Processes

As described above, the exemplary cooked meat portion 22 formed using the Tender-Form process has a grain structure that allows it to be eaten as is or broken apart into the sub-portions 24. The manufacturing process described below is specifically engineered to obtain and preserve the grain structure during fabrication of the meat portion 22.

In particular, the primary factors that affect the grain structure are the mechanical processing and temperature of the raw meat. In the following discussion, all of these factors will be described throughout the processing or manufacturing steps set forth below.

Raw meat is preferably provided in an unground form in what will be referred to as a solid-frozen state. In this solid-frozen state, the meat is preferably maintained approximately between 0–5° F., can be within a second preferred temperature range of approximately 0–10° F., and in any event should be maintained at a temperature of less than approximately 20° F.

The raw, solid frozen meat is next tempered to a semi-frozen state of approximately 27–32° F. When in the semi-frozen state, the raw meat is ground and blended with one or more additives to obtain a formulated meat mixture.

The ground meat can be obtained using conventional equipment. A common method of grinding meat is to use a pre-breaking grinding machine such as a Weiler#1612 to reduce 60 lbs. blocks of frozen meat into smaller (¾" diameter) chunks. These chunks are then fed into a grinding machine such as a Weiler Grinder #1109 or #1107. Grinders such as the Weiler #1109 or #1107 finely grind larger discrete portions of meat into cylindrical extrusions having a diameter of approximately 3/32" or ⅛". These extrusions are mechanically cut into varying short lengths and are appropriate in mass for forming a raw meat portion as will be discussed below.

The exact formulations of the additives employed vary depending on the particulars of the cooked ground meat product being manufactured, and a number of examples of these proportions are described at the end of this specification. These additives generally comprise a moisture absorbing agent such as soy protein, flavorings, salt, and possibly hydrated soy protein added to increase yields.

While the raw ground meat is in the semi-frozen state, the additives are mixed or blended with the raw ground meat using conventional techniques that thoroughly distribute the additives throughout the raw ground meat to obtain the formulated meat mixture.

Referring now to FIG. 1 of the drawings, depicted at 26 therein is the formulated meat mixture. This formulated meat mixture 26 is contained in a forming machine 28. The forming machine 28 comprises a hopper portion 30 defining a hopper chamber 32 and comprising a fill plate 34, a mold plate 36, an end wall 38, a punch 40, and a conveyor assembly 42. The forming machine 28 may be one of several models of portion forming machines such as those sold by FORMAX using the trademark Tender-Form®. The fill plate 34 defines a plurality of small holes 46 that, with the system as shown in FIG. 1, allow fluid communication between the hopper cavity 32 and the mold cavity 44. The mold plate 36 defines a mold cavity 44, and the mold plate reciprocates between a first position in which the mold cavity 44 is aligned with the fill plate 34 and a second position in which the mold cavity 44 is aligned with the punch 40.

As shown in FIG. 2, the formulated meat mixture 26 is forced through the holes 46 in the fill plate 34 and into the mold cavity 44. As it is forced through these holes 46, the formulated meat mixture 26 takes on a precursor form of the grain structure described above.

In particular, while in the semi-frozen state, the formulated meat mixture 26 is extruded from the fill plate into the mold cavity 44 to obtain a plurality of raw sub-portions such as those identified by reference character 48. These raw sub-portions 48 are extruded through the holes 46 and thus have a cross-sectional area corresponding to that of the holes 46. The cross-sectional area of the exemplary holes 46 is circular with a diameter of approximately ¼", yielding sub-portions 48 that are generally cylindrical; the diameter of the sub-portions 48 are a diameter of slightly larger than ¼" as is discussed below. The sub-portions 48 are elongate and are vertically arranged in the mold cavity 44.

FIG. 2 depicts the process of filling mold cavity 44 with the sub-portions 48. As the formulated meat mixture 26 is extruded from the holes 46 into the mold cavity 44, the diameters of the sub-portions 48 will increase until the sides of the sub-portions 48 come into contact with each other. The properties of the formulated meat mixture 26 are such that the mixtures 26 is slightly tacky and a loose bond is formed between adjacent sub-portions 48.

The formulated meat mixture 26 is preferably maintained at a temperature of approximately 29° F. when it is forced through the fill plate 34, but in any event should be kept in the semi-frozen state. When in the semi-frozen state, the formulated meat mixture 26 contains ice crystals but is still sufficiently fluid to be mechanically processed. Within this temperature range, the ice crystals in the formulated meat mixture form a barrier between the adjacent sub-portions 48 as will be discussed in detail below.

When the mold cavity 44 is filled, the formulated meat mixture 26 within the mold plate 36 moves from the first position into the second position as shown in FIG. 3. The tolerances between a first surface 50 of the mold plate 36 and the fill plate 34 are such that movement of the mold plate 36 from the first position into the second position shears the meat along a plane coextensive with this first surface 50 to form a ground meat portion 52 as shown in FIG. 3.

The bond between adjacent sub-portions 48 is such that the sub-portions stay together during subsequent processing in the form of the ground meat portion 52. But the barrier formed by the ice crystals ensures that the bond between the sub-portions 48 is not so firm that the sub-portions 48 lose the independent identity necessary to allow the sub-portions 24 (FIG. 12) of the cooked ground meat product 20 to be broken apart as described above.

The uncooked ground meat portion 52 has the grain structure of the cooked ground meat product 20 described above. In particular, a plurality of raw sub-portions 48 are arranged side-to-side with their axes substantially parallel such that the ends of the sub-portions 48 form first and second face surfaces 54 and 56 of the uncooked ground meat portion 52.

The shearing action between the surface 50 of the mold plate 36 and the fill plate 34 tends to form what will be referred to as a "skin region" on both of the face surfaces 54 and 56. This skin region exists along each of the face surfaces 54 and 56 where the ends of the sub-portions 48 are smeared together. The skin disrupts the grain structure of the ground meat portion 52 but helps to hold this portion 52 together prior to the perforating step described below.

FIG. 4 shows the mold plate 36 with the ground meat portion 52 filling the mold cavity 44. The physical dimensions of the mold plate 36, and in particular the vertical dimension of the mold cavity 44, define the physical dimensions of the ground meat portion 54. In particular, the ground meat portion 52 has a thickness "t" (FIG. 5), length "l" (FIG. 4), width "w" (FIG. 4), and corners having a radius "r" (FIG. 4).

Additionally, at least a portion of the sides of the outermost of these raw substructures 48 (FIG. 3) does not engage an adjacent substructure 48; these non-adjacent portions of the sides of the outermost substructures 48 define an edge surface 58 of the ground meat portion 52 that extends between the first and second face surfaces 54 and 56.

As is discussed throughout this application, the grain structure of the ground meat portion 52 allows the cooked ground meat portion 22 to be broken apart into the sub-portions 24. Additionally, the grain structure, along with maintaining proper temperature of the ground meat portion 52, allows the formulated meat mixture to be handled in discrete, measurable portions throughout the packaging and cooking steps; the grain structure also allows the cooked ground meat product 20 to be broken apart into the cooked ground meat 24 at a later time.

Referring back to FIG. 3, when the mold plate 36 is in its second position, the knock-out punch 40 is moved down through the mold cavity 44 such that the ground meat portion 52 is deposited on a conveying surface 60 of the conveyor assembly 42 as shown in FIG. 5. The bond between adjacent raw substructures 48 and the skin region holds the ground meat portion 52 together as it is deposited onto the conveyor assembly 42.

Figure 7:
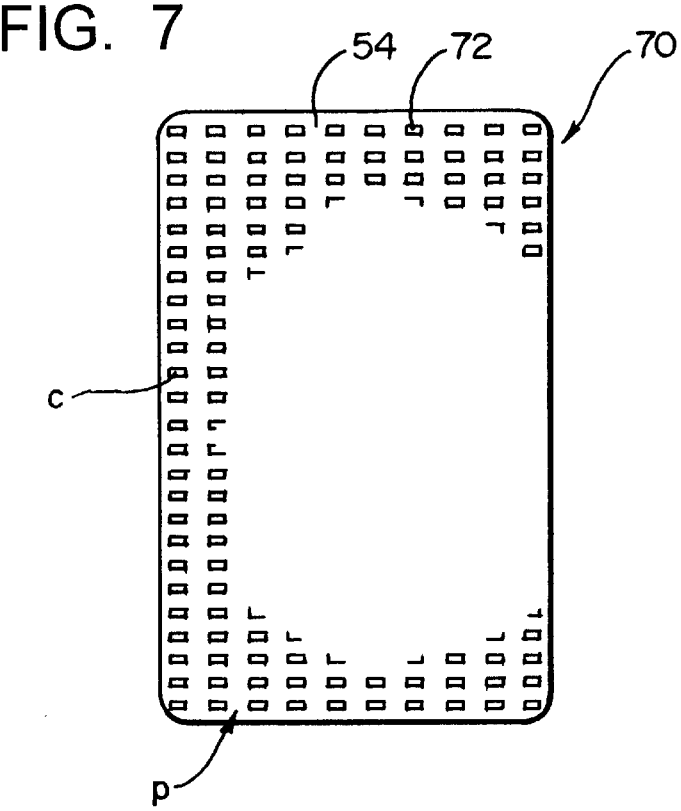
FIG. 7 is a top plan view of a meat product perforated with the perforator of FIG. 6.

Referring now to FIG. 6, it can be seen that the conveying surface 60 carries the ground meat portion 52 between first and second perforating wheels 62 and 64. Axes A and B of these wheels 62 and 64 are aligned on opposite sides of the conveying surface 60 such that teeth 66 and 68 of these wheels 62 and 64 engage and perforate the ground meat portion 52 to obtain a perforated ground meat portion 70 (FIG. 7). These wheels 62 and 64 may be implemented using a cuber-perforator available from FORMAX, INC. under the following model nos.: FORMAX MC 6, 12, or 27 CUBER-PERFORATOR.

The perforations 72 (FIG. 7) are formed in an array on the first and second face surfaces 54 and 56. The perforations 72 do not extend completely through the perforated ground meat portion 70. The perforations 72 are thus more in the nature of depressions or cavities and are not through-holes.

These perforations 72 have a depth "d" (FIG. 10) that corresponds to a dimension of the perforations 72 that extends from one face surface towards the other face surface. The teeth 66 and 68 have a working cross-sectional area that defines a cross-sectional area "c" (FIG. 7) of the perforations 72. Additionally, the perforations have a density "p",(FIG. 7) of the perforations, defined by perforations per square inch or percentage of the surface area perforated.

As generally shown in FIGS. 6 and 7, the depth "d", cross-sectional area "c", and density "p" of the perforations 72 may be important in that the perforations should be of sufficient size and depth to trap as much moisture as possible purged from the ground meat portion 52 during cooking. The perforations 72 should also be of sufficient depth, surface area, and density to disrupt the skin region defined above and to trap air to help maintain an aerobic condition in the ground meat portion when the package is not under complete vacuum, as described below.

If these parameters are kept within certain limits, the grain structure of the ground meat portion 52 will be altered in a manner that does not materially interfere with the grain structure of the cooked ground meat 24 discussed above. To the contrary, these perforations help maintain the characteristics of the grain structure by disrupting the skin region formed during formation of the ground meat portion 52. These perforations may also help maintain the aerobic condition within the ground meat when applicable.

Referring now to FIG. 8, it can be seen that the conveying surface 60 carries the perforated ground meat portions 70 into a freezing unit 74 to obtain frozen perforated ground meat portions 70a. The freezing unit 74 may be nitrogen-based, $CO_2$-based, or conventional and should ensure that the frozen perforated ground meat portions 70a are in or near the solid-frozen state.

Referring now to FIG. 9, it can be seen that the frozen perforated ground meat portions 70a are next packaged within a cooking envelope 76 defined by a first film sheet 78 and a second film sheet 80. These film sheets 78 and 80 are bonded in a conventional manner around the frozen perforated ground meat portion 70a to enclose this portion 70a within a product chamber 82. An appropriate system for forming the envelope 76 is sold by MULTIVAC, INC. under the following Model Nos.: R230 or R530.

The, exemplary film sheets 78 and 80 should be less than 8.0 mm, with the film sheet 78 being approximately 5.0–6.0 mm and the bottom sheet being approximately 5.0–6.0 mm, in thickness. These sheets should be clear or white opaque with printing applied where necessary, with the following sheets available from the CRYOVAC DIVISION of W.R. Grace & Co. being appropriate: R669WB or H6240WB for the top film sheet and RDX3382A or 9S598 for the bottom film sheet.

The combination of the frozen perforated ground meat portion 70a and the envelope 76 will be referred to herein as a packaged, perforated, ground meat product 84.

During the process of sealing the sheets 78 and 80 together, most of the ambient air within the product chamber 82 is removed to obtain what is commonly referred to as a vacuum pack. The packaged, perforated, ground meat product 84 is thus vacuum packed.

As the vacuum is established between the two sheets 78 and 80, these sheets 78 and 80 will exert significant pressure on the perforated ground meat portion 70a within the product chamber 82. The perforated ground meat portion 70a should be maintained near or in the solid-frozen state during the process of forming the envelope 76 so that the sheets 78 and 80 do not alter the physical structure (i.e., grain structure, perforations) of the perforated ground meat portion 70.

In particular, while the envelope 76 is being formed, the meat portion 70a should be kept, within a first preferred range of between approximately 10–20° F., within a second preferred range of approximately 0–25° F., and in any event should be kept below approximately 28° F. At these temperatures, the meat portion 70a becomes relatively rigid and will not compress as easily.

If the film sheets 78 and 80 are allowed to compress the ground meat portion 52 during the vacuum forming stage such that the grain structure or the perforations 72 are significantly altered, the perforations 72 will not be able to contain the moisture purged during cooking.

The packaged, perforated ground meat product 84 (FIG. 11) is next cooked in a cooking unit 86 to obtain cooked, packaged, perforated, ground meat portions 88. The cooking unit 86 is preferably a steam cooking system such as that sold by ENVIROPAK, a division of TECH MARK, INC., of Klackamas, Oreg. An impingement steam cooking system continuously cooks the product using jets of steam mixed with hot air. The other preferred method is a water cooking system where the packaged, ground meat product is cooked in hot water. This cooking method is preferred when the packaged meat product is under partial, but not complete, vacuum within a predetermined range of one to four inches of vacuum as described below. Cooking in hot water allows the pressure of the water to force more thermal contact through the packaging and to the ground product. When there is air left in the package, cooking times are reduced using hot water cooking as compared to a steam cooking system although in any case air left in the package causes longer cooking times as compared to when the package is under vacuum.

The packaged, perforated, ground meat product 84 should be near or in the solid-frozen state as it enters the cooking unit 86. A temperature range of between approximately 10–20° F. is preferable, and the temperature should in any event be less than approximately 25°. This maintains the grain structure as long as possible before cooking; once the product is cooked, the grain structure is much less likely to be disrupted.

The product 84 should be cooked by the cooking unit 86 under the following conditions. The minimum internal temperature of the vacuum-packaged, perforated ground meat portion during cooking is preferably approximately 165–170° F. and, in one embodiment of the invention, is preferably within an internal range of between approximately 160° F. and 180° F. and not more than approximately 200° F.

The lower end of this range ensures that pathogens within the ground meat are killed. If the temperatures are too high, excess purge will overwhelm the physical structure and additives for trapping and absorbing the purge provided for by the invention.

External cooking temperatures within a cooking range of approximately 170° F. to approximately 250° F. will raise the internal temperature to the desired levels. External cooking temperatures in the range of approximately 212–250° F. may be employed, but the sheets 78 and 80 must be capable of withstanding these higher temperatures.

The amount of air within the package, the product temperature, and the external cooking temperature used will determine the cooking time, with the product 84 being subjected to a given external cooking temperature for as long as necessary to obtain the desired internal temperature.

Once the product has reached its desired internal cooking temperature, the product is removed from the cooking unit 86 and cooled to a storage temperature range that is preferably substantially between 30° F. and 38° F. This cooling should occur within two hours after application of the cooking temperature and be maintained until the product is used or the product is solid-frozen. Freezing the product will extend its shelf life, but marketing considerations may militate in favor of distributing and retailing the product in an unfrozen state in some situations.

Referring now to FIG. 10, depicted therein is an enlarged view of the packaged, perforated, ground meat portion in the process of being cooked. FIG. 10 shows that the perforations 72 described above, together with the films sheets 78 and 80, define a plurality of substantially closed moisture collecting chambers 90. FIG. 10 also depicts liquid 92, which represents the purge described above, collects within these moisture collecting chambers 90 as well as air which may be in the package when applicable.

An important benefit of forming the vacuum within the envelope 76 as described above is that being under vacuum speeds re-absorption of purge. In particular, the vacuum compresses the sheets 78 and 80 tightly against the surfaces 54 and 56 of the portion 70a. Being under vacuum also reduces the volume of air within the envelope 76, which greatly reduces cooking times. When this air cools after cooking, the sheets 78 and 80 thus seal off each of the individual perforations 72, forming the chambers 92 which trap the purge within the perforations 72.

The purge thus is not free to flow within the envelope 76 and collect in large quantities that would be more difficult or impossible to reabsorb unless the tenderizing step is used as described below. Instead, because the purge is trapped and is under a vacuum, re-absorption of this purge by the absorptive additive distributed throughout the product 84 is enhanced.

The effect of the vacuum packaging is to reduce purge that would otherwise flow freely within the package. The vacuum packaging thus decreases the yield loss due to purge, enhances the aesthetic appearance and cooking efficiency of the packaged product, and, as discussed below, can in some situations prolong the shelf life of the product.

If kept refrigerated below 38° F., the cooked, packaged, ground meat product 88 may be distributed using conventional distribution channels. The exemplary product 88 has a shelf life that is significantly longer than that of unfrozen raw ground meat. If left in its package and refrigerated at within the storage temperature range, the product 88 will not spoil for at least 60 days and up to 90 days or more depending on the circumstances. If kept frozen, the product 88 may be stored for a year or more prior to use.

When the end user wishes to use the product 88, the cooked ground meat product 20 discussed above is simply removed from the envelope 76. The product 20 may be consumed directly in portion form as the cooked ground meat portion 22 or broken apart and used as cooked ground meat 24. Preferably, the product is broken apart while still in the envelope 76. No cooking is required, although many recipes will result in the product 20 being heated during final preparation of the meal.

C. Additional Manufacturing Processes

An acceptable cooked ground meat portion can be manufactured as described above. The following discussion describes certain refinements to and variations on the basic process described above that may result in an equally acceptable cooked ground meat portion.

Referring initially to the vacuum-forming step described with reference to FIG. 9 above, this step is described in further detail below with reference to FIGS. 13A–D. The first film sheet 78 of the cooking envelope 76 is conventionally referred to as the forming film, while the second film sheet 80 thereof is referred to as the non-forming film.

Figure 13A:
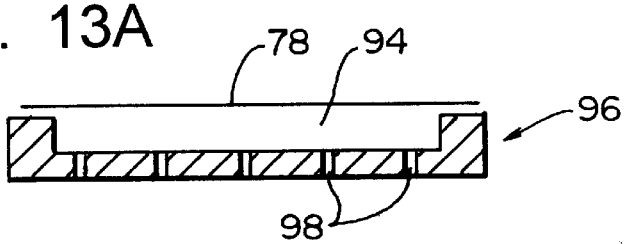
FIGS. 13A–D are side, elevation, cut-away views of one exemplary system for packaging a meat product that may be used in connection with the system of FIG. 1.
Figure 13B:
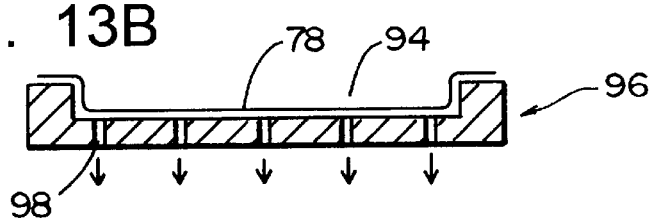

As shown in FIG. 13A, the forming film 78 is arranged over a forming cavity 94 formed in a mold plate 96. Vacuum ports 98 are formed in the plate 96 to allow a vacuum to be formed within the cavity 94. As shown by arrows in FIG. 13B, applying a vacuum to the vacuum ports 98 causes air to be with drawn from the forming cavity 94. The forming film 78 forms a seal with the mold plate 96 such that the vacuum within the cavity 94 stretches or distorts the forming film 78 such that the film 78 lines the cavity 94.

Figure 13C:
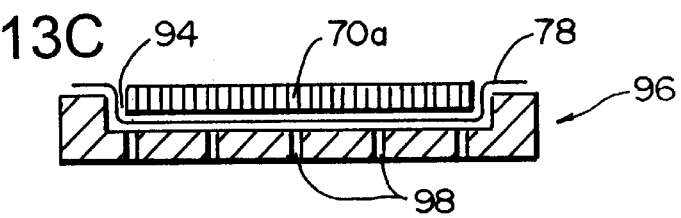
Figure 13D:
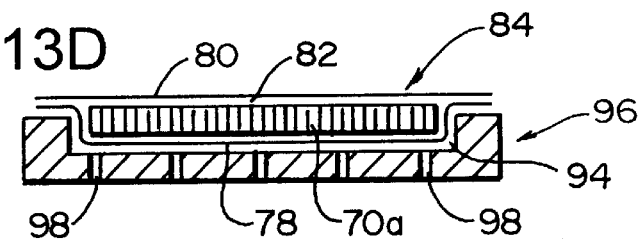

The frozen perforated ground meat portion 70a is then placed into the forming cavity 94 on the forming film 78 as shown in FIG. 13C. The non-forming film 80 is then placed over the meat portion 70a and the forming cavity 94 as shown in FIG. 13C. Using a conventional vacuum forming process, a vacuum is then formed between the forming film 78 (FIG. 13D) and the non-forming sheet film 80 to withdraw the desired amount of air from therebetween. The perimeter edges of the films 78 and 80 are then heated and sealed together by direct pressure to form the product chamber 82 and thus the packaged, perforated, ground meat product 84.

The evacuation of air from the product chamber 82 is an important factor because this effectively reduces the insulation around the ground meat portion 70a. With less insulation, the subsequent cooking process described with relation to FIG. 11 can be completed more quickly. Faster cooking times allow greater production rates and reduced production costs.

Once the packaged, perforated, ground meat product 84 is obtained, an additional step may be performed between the cooking step (FIG. 11) and the cooling step. This additional step will be referred to herein as the tenderizing step and will be discussed with reference to FIGS. 14, 15A–D, and 16.

Figure 14:
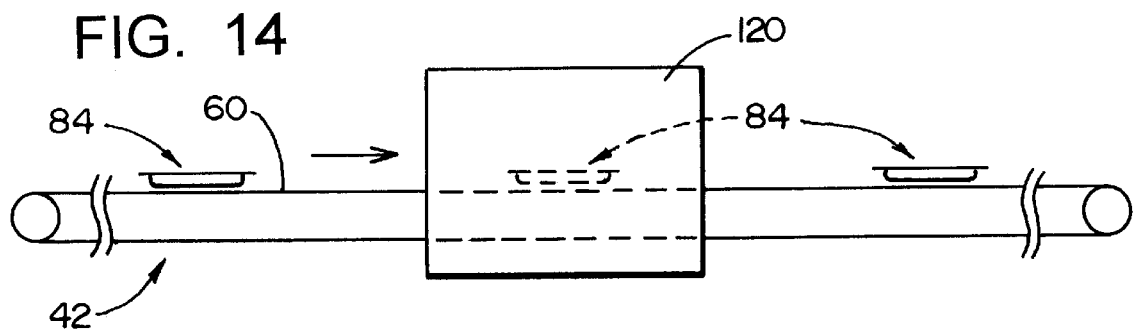
FIG. 14 is a side, elevation, somewhat schematic view of a tenderizing system that may be used in connection with the system of FIG. 1.

In particular, as shown in FIG. 14, the packaged cooked ground meat portion 84 on the surface 60 of the conveyor assembly 42 may be passed through a tenderizer 120 after the cooking step depicted in FIG.

Figure 15A:
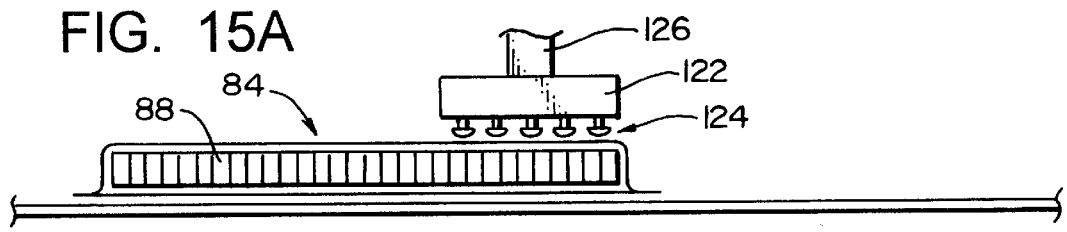
FIGS. 15A–D are side, elevation, cut-away views of one exemplary tenderizing apparatus that may be used to implement in the tenderizing system of FIG. 14.
Figure 15B:
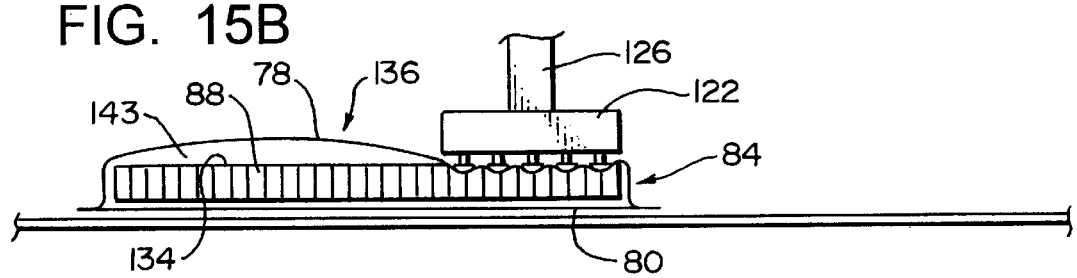
Figure 15C:
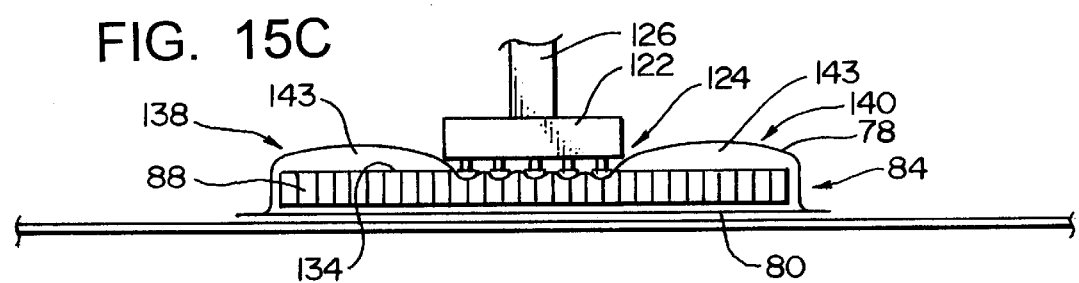
Figure 15D:
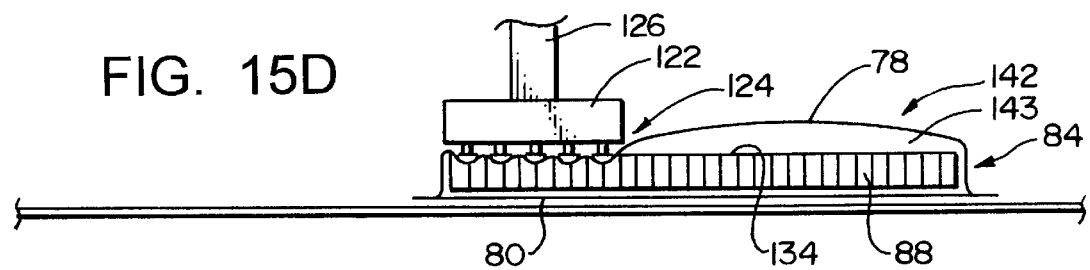
Figure 16:
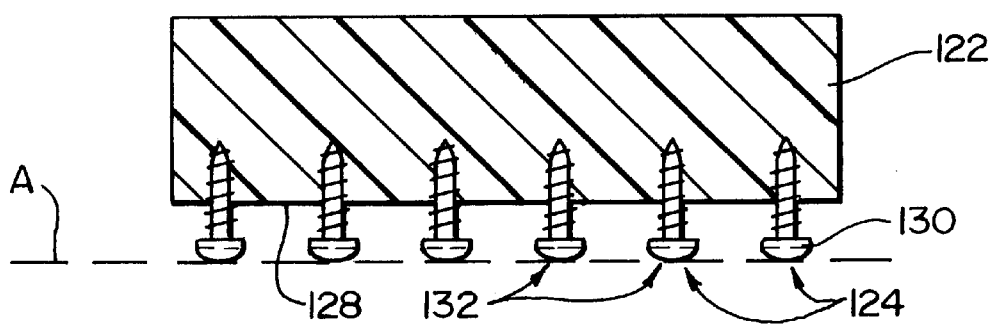
FIG. 16 is a side, elevation, cut-away view of one exemplary tenderizing member that may be used by the tenderizing apparatus of FIGS. 15A–D.

As best shown in FIGS. 15 and 16, the tenderizer 120 comprises a tenderizer plate 122, pressure points 124, and a tenderizer shaft 126.

The tenderizer plate 122 is mounted on the shaft 126 such that reciprocating axial movement of the shaft 126 causes the plate 122 to move up and down relative to the conveyor surface 60. A bottom surface 128 of the plate 122 is maintained substantially parallel to the conveyor surface 60. The exemplary tenderizer plate 122 is made of a solid block of Delron.

The exemplary pressure points 124 are simply stainless steel screws that are threaded into the tenderizer plate 122 such that heads 130 of these screws are arranged in a substantially planar array that is substantially parallel to the conveyor surface 60. The exemplary screw heads 130 have a diameter of approximately $3/8$", have a rounded lower surface portion 132, and are evenly spaced from each other in a rectangular array. In the exemplary plate 122, the screw heads 130 are spaced from each other a distance of approximately three-quarters of an inch on center. This distance should be within a first predetermined range of approximately one-half inch to one inch and in any event should be in a second range of one-half to one and one-half inches.

The tenderizer shaft 126 may be connected to a conventional actuator, such as a pneumatic actuator, that can move the shaft 126 up and down with a stroke of at least $1/2$ to $3/4$ of an inch between an up position as shown in FIG. 15A and a down position as shown in FIGS. 15B–D.

This stroke allows the screwhead lower surface portions 132 to be raised far enough above the packaged ground meat product 84 when tenderizer shaft 126 is in the up position that the surface portions 132 allow the conveyor assembly 42 to move meat product 84 without interference.

When the screwhead lower surface portion 132 is in the down position, the stroke of the lower surface portion displaces a tenderizer plane A (FIG. 16) a predetermined plunge distance below an upper surface 134 of the meat portion 88 of the meat product 84. A number of -variables affect the amount that the tenderizer plane A extends into the meat portion 88. These variables should be set such that the plunge distance is approximately $3/16$ of an inch, should be within a first preferred range of approximately $1/16$–$1/2$ of an inch, but in any event should be at least $1/32$ of an inch and not greater than the thickness of the meat portion 88.

As shown in FIGS. 15B–C, the exemplary tenderizer plate 122 is sized and dimensioned to cover approximately $1/3$ of the surface area of the meat portion 88. The exact relative size of the plate 122 relative to the meat portion 88 is not critical as long as the entire meat portion 88 is not covered at one time. And as the conveyor assembly 42 moves the meat portion 88 relative to the tenderizer plate 122, the exemplary tenderizer shaft 126 moves up and down at a frequency that results in the pressure points 124 engaging the meat product 84 approximately four times. The more the screwhead lower portions 132 contact the forming film 78 and the meat portion 88, the more pre-crumbling of portion 88 will occur.

Accordingly, the entire product 84 is tenderized, but only a portion of the product is tenderized at any given point in time. As shown (in an exaggerated fashion) by reference characters 136,138, 140, and 142 in FIG. 15D, the forming film layer 78 is slightly distorted during the tenderizing process. This distortion is caused in part by air 143 within the package that has expanded during the heating process. Tenderizing only a portion of the product 84 at any given point in time allows this distortion to occur without tearing or ripping the product envelope 76. A plurality of tenderizer plates 122 may be provided and moved in synchrony to obtain a similar effect.

Because of the internal package pressure created by the tenderizing process, the air 143 within the package is forced into the meat each time the pressure points plunge into the packaged meat product. This product helps maintain an aerobic condition within the ground mean when applicable.

The tenderizing process itself pummels the meat so that the cooked meat portion 20 more easily breaks apart into the sub-portions 24a. While the tenderizing step improves the ability of the cooked meat portion 20 to be broken apart under any circumstance, this step is of particular importance when the standard fill process is used instead of the Tender-Form fill process.

D. Standard Fill

As described above, the Tender-Form process is preferably used during the formation of the ground meat portion 52. An alternative would be to use a standard fill process to obtain the ground meat portion 52.

The standard fill process differs from the Tender-Form process in that the formulated meat mixture 26 does not necessarily enter mold cavity 44 in the mold plate 36 in vertically arranged, coaxially aligned columns. Instead, the formulated meat mixture 26 is expelled in strands or extrusions that will enter the mold cavity 44 in perhaps a spiral or other arrangement. These strands or extrusions of meat will likely not be vertically aligned relative to the mold plate 36. Accordingly, the ground meat portion 52 formed by the standard fill process will not have the grain structure described above.

The lack of this grain structure will make breaking the cooked ground meat portion 20 apart into discrete sub-portions of appropriate size more difficult, all other factors being the same.

To obtain an acceptable cooked ground meat portion 20 using the standard fill process ARCON-S may be used as the soy additive instead of ARCON-T as described above, the ground meat portion 52 may be made thinner, the perforations may be made deeper and more dense, and the plunge of the tenderizing process may be made more often.

In any event, it is possible to vary certain parameters of the basic process described above and still obtain a commercially viable cooked ground meat product. The exemplary cooked ground meat portion 20 and the process of manufacturing that portion 20 are optimized for commercial marketability, but certain variations can be introduced to obtain a less than optimum, but still acceptable, ground meat portion.

E. Measures for Preventing The Growth of Chlostridia Bacteria

The use of a vacuum packed product such as the product 20 raises the issue of poisoning from chlostridia bacteria, including prefringens and botulinum bacteria. Ambient air is removed from the package as described above for two primary reasons.

First, air within the product chamber 82 (FIG. 9) insulates the meat portion 70a and thus increases the cooking time of the packaged product 84. By removing air from the product chamber 82, the insulation surrounding the meat portion 70a is reduced, which in turn reduces the product cooking time. This reduction in product cooking time results in a significant reduction in manufacturing costs.

Second, air within the sealed product chamber 82 encourages the spoilage of the meat product 20, so reducing the amount of air in the chamber 82 reduces the rate at which the product 20 spoils from aerobic bacteria. The removal of ambient air thus also increases the shelf life of the final cooked ground meat product 20 as long as the product 20 remains in the chamber 82.

But it is well known that a completely anaerobic environment, such as that created during canning and other food preparation processes, could encourage the growth of chlostridia bacteria such as the botulinus bacteria that cause botulism.

In the present situation, much of the air within the product chamber 82 may be removed, which can create an anaerobic environment conducive to the growth of chlostridia bacteria. Accordingly, steps must be taken to ensure that other aspects of the environment within the product chamber 82 are altered to prevent the growth of chlostridia bacteria.

Of the many steps that can be taken to inhibit the growth of chlostridia bacteria, some are not practical or desirable with the cooked meat product 20 as described herein.

Adding sodium nitrite in combination with salt to the product can prevent the growth of chlostridia bacteria but would not result in an acceptable product in this case.

Reducing the moisture content of the product 20 such that the product 20 has a Water Activity Index of 0.92 or less can prevent the growth of chlostridia bacteria. A ground beef product having such a low Water Activity Index would not be practical, however.

Heating the product 20 to a temperature of 250° F. for an extended number of minutes may inhibit and prevent the growth of chlostridia bacteria. But these cooking temperatures are too high for a variety of reasons.

Other steps available for eliminating the risk of poisoning from chlostridia bacteria include maintaining the temperature of the cooked product at less than 38° F., increasing the water phase salt level in the product to above 8–10%, or reducing the pH of the product to 4.6 or less.

The Applicant intends that, as long as the meat product 20 is sealed under vacuum within the product chamber 82, the product 20 should be refrigerated such that the temperature of the product is less than 38° F. The product can easily be maintained within this temperature range during shipping and retail display and by the consumer before consumption. The packaging of the product 20 will also will be marked with a warning such as "KEEP REFRIGERATED" or "KEEP FROZEN". But the possibility exists that the retail grocer or consumer will abuse the product by not maintaining its temperature at less than 38° F. for a prolonged period of time. Accordingly, additional steps may need to be taken to prevent botulism.

One preferred option is to modify the MULTIVAC vacuum forming equipment described above. The standard vacuum forming equipment of which the Applicant is aware does not allow the amount of vacuum established within the product chamber 82 to be absolutely controlled and consistently repeated if a partial vacuum is desired. Vacuum is commonly measured in units of bars or inches of vacuum. The Applicant's test equipment employs inches of vacuum, and that unit of measure will be used herein. With these units, 0 inches of vacuum corresponds to no vacuum and 29 inches of vacuum corresponds to a complete vacuum.

The Applicant modified the MULTIVAC vacuum forming equipment by placing a vacuum breaker in line between the vacuum pump and the product chamber. The vacuum breaker is similar to a pressure release valve but is triggered when the pressure (amount of vacuum) goes below, rather than above, a predetermined value. The vacuum breaker allows a controlled vacuum to be established within the product chamber to assure the continued and absolute accuracy of the vacuum machine's partial vacuum setting.

As described above, botulism occurs only in an anaerobic environment. If an anaerobic environment can be avoided, the growth of chlostridia bacteria will be prevented.

A vacuum forming machine can be set to draw only a partial vacuum, with a vacuum breaker provided for safety to ensure that the machine draws a partial but not complete vacuum within the product chamber. A partial vacuum so formed will reduce the amount of excess air within the product chamber and thus the excess insulation created by this air. On the other hand, the partial vacuum leaves some air within the chamber and thus avoids an anaerobic environment.

The Applicant has discovered that establishing approximately 1 inch of vacuum within the product chamber would leave sufficient air in the product chamber to avoid an anaerobic environment. This vacuum should ordinarily be within a first predetermined range of 1 to 2 inches of vacuum but in any event should be within a second predetermined range of 0 to 4 inches of vacuum. Any more vacuum (more than 4 inches) and the possibility of an anaerobic environment is created. Even with only 0 to 4 inches of vacuum, cooking times are considerably longer than with higher vacuum levels.

The product chamber is thus aerobic and not conducive to the growth of chlostridia bacteria. Importantly, if the product is temperature abused, the aerobic environment will allow the product to spoil in a manner that is apparent to the consumer (i.e., unappetizing smell and taste). The product may have a shelf life that is relatively short compared to other embodiments of the invention.

In general, a safe, commercially acceptable product will likely involve a combination of these steps, although it may be that not all of these steps are necessary.

F. Packaging Examples

Any specific product manufactured using the principles of the present invention will likely employ a combination of, but not all, of the manufacturing steps described above. Most of the variations to the basic process described above relate to the packaging of the product and how this packaging affects cooking times, storage times, and product safety. The packaging of the product represents a balance of a number of design goals such as reduced versus longer cooking times, refrigerated versus frozen during shipping, storage, and display, and longer versus reduced shelf life.

At the time of the filing of the present application, the Applicant believes that the following examples provide the safest, most cost efficient, and most commercially acceptable methods of packaging the frozen, perforated meat portion or product described above.

The first packaging example employs the steps of establishing a complete vacuum, cooking the product, and maintaining the cooked, packaged product below 38° F. or in a frozen state until immediately prior to use.

The second packaging example employs the steps of establishing a partial vacuum within the product chamber and cooking the packaged product for a longer period of time to reach the desired internal temperature. The product is then kept refrigerated or frozen until use.

G. Formulation Examples

The following discussion sets forth a number of tables containing examples of the mixed ground meat 26 (FIG. 2) described above. Each table contains a description of the ingredients, a preferred formulation, and first and second preferred ranges of ingredients. The preferred ranges assume that a fixed quantity of ground meat is used, and the remaining ingredients are given as percentage ranges of the fixed quantity of ground meat.

In these examples, the overall moisture absorbing capacity of all ingredients is taken into account. For example, if dry spices or seasonings are used, a lower amount of soy protein may be in order. If liquid additives are used, however, more soy protein may be used in the formulation.

GRILL FLAVORED BEEF

The following TABLE A lists ingredients that may be combined to obtain a first exemplary style of formulated meat mixture 26. This first exemplary style would be commonly referred to as a grill flavored beef.

TABLE A

| Ingredient | Preferred Embodiment | First Preferred Range | Second Preferred Range |
| --- | --- | --- | --- |
| Ground beef | 100 lbs. | 100 lbs. | 100 lbs. |
| Soy protein | 5.5 lbs. | 5–6% | 3.5–7.5% |
| Encapsulated salt | 0.875 lbs. | 0.5–1% | 0–2% |
| Spice blend | 0.06 lbs. | 0.01–0.15% | 0.005–0.50% |

The spice blend called out in TABLE A is one of two spice blends that can be used from Red Arrow Products Co. of Manitowoc, Wis. The first is GRILLIN TYPE SD-10, item #88010D, which contains maltodextrin, grill flavor (from vegetable oil), modified food starch, corn syrup solids, and less that two percent tricalcium phosphate as an anti-caking agent. As an alternative, GRILLIN TYPE GB, item #570130, available from Red Arrow Products Co. of Manitowoc, Wis., may be used; GRILLIN TYPE GB contains maltodextrin, salt, grill flavor, modified food starch, corn syrup solids, smoke flavoring, tri-calcium phosphate (anti-caking agent).

The soy protein is a soy concentrate that may be purchased from Archer Daniels Midland under the trade name ARCON-T or alternately ARCON-S.

TACO FLAVORED BEEF

The following TABLE B lists ingredients that may be combined to obtain a second exemplary style of formulated meat mixture 26. This second exemplary style would be commonly referred to as a taco flavored beef.

TABLE B

| Ingredient | Preferred Embodiment | First Preferred Range | Second Preferred Range |
| --- | --- | --- | --- |
| Ground beef | 100 lbs. | 100 lbs. | 100 lbs. |
| soy protein | 3.5 lbs. | 2–4% | 1.5–5.5% |
| spice blend | 6.0 lbs. | 5–7% | 4–8.0% |

The spice blend called out in TABLE B is procured from the Heller Spice Co. as LENZ TACO SEASONING #3 as described below.

The soy protein is a soy concentrate that may be purchased from Archer Daniels Midland under the trade name ARCON-T or alternately ARCON-S.

GRILL FLAVORED TURKEY

The following TABLE C lists ingredients that may be combined to obtain a third exemplary style of formulated meat mixture 26. This third exemplary style would be commonly referred to as a grill flavored is turkey.

TABLE C

| Ingredient | Preferred Embodiment | First Preferred Range | Second Preferred Range |
|---|---|---|---|
| ground turkey | 100 lbs. | 100 lbs. | 100 lbs. |
| soy protein | 5.5 lbs. | 4.5–6.5% | 3.5–7.5% |
| encapsulated salt | 0.875 lbs. | 0.375–1.375% | 0–2% |
| spice blend | 0.06 lbs. | 0.01–0.15% | 0.005–0.50% |

The spice blend called out in TABLE C is available from Red Arrow Products Co. of Manitowoc, Wis. as GRILLIN TYPE SD-10, item #8801 OD, which contains maltodextrin, grill flavor (from vegetable oil), modified food starch, corn syrup solids, and less that two percent tricalcium phosphate as an anti-caking agent.

As an alternative, GRILLIN TYPE GC, item #590120, may be used as the spice blend. GRILLIN TYPE GC contains maltodextrin, salt, corn flour, grill flavor, corn syrup solids, modified food starch, smoke flavoring, tricalcium phosphate (anti-caking agent).

The soy protein is a soy concentrate that may be purchased from Archer Daniels Midland under the trade name ARCON-T or alternately ARCON-S.

TACO FLAVORED TURKEY

The following TABLE D lists ingredients that may be combined to obtain a fourth exemplary style of formulated meat mixture 26. This fourth exemplary style would be commonly referred to as a taco flavored turkey.

TABLE D

| Ingredient | Preferred Embodiment | First Preferred Range | Second Preferred Range |
|---|---|---|---|
| ground turkey | 100 lbs. | 100 lbs. | 100 lbs. |
| soy protein | 3.5 lbs. | 2.5–4.5% | 1.5–5.5% |
| spice blend | 6.0 lbs. | 5–7% | 4–8.0% |

The spice blend called out in TABLE D is procured from the Heller Spice Co. as LENZ TACO SEASONING #3.

The soy protein is a soy concentrate that may be purchased from Archer Daniels Midland under the trade name ARCON-T or alternately ARCON-S.

EXTENDED GRILL FLAVORED BEEF

The following TABLE E lists ingredients that may be combined to obtain a fifth exemplary style of formulated meat mixture 26. This s fifth exemplary style would be commonly referred to as an extended grill flavored beef.

TABLE E

| Ingredient | Preferred Embodiment | First Preferred Range | Second Preferred Range |
|---|---|---|---|
| Ground beef | 100 lbs. | 100 lbs. | 100 lbs. |
| first soy protein | 5.5 lbs. | 4.5–6.5% | 3.5–7.5% |
| Water | 4 lbs. | 2.0–10.0% | 0.4–16.0% |
| Second soy protein | 1.0 lbs. | 0.5–2.5% | 0.1–4.0% |
| Encapsulated salt | .875 lbs. | 0.375–1.375% | <2.0% |
| spice blend | 0.10 lbs. | 0.01–0.2% | 0.005–0.5% |

The spice blend called out in TABLE E is one of two spice blends that can be used from Red Arrow Products Co. of Manitowoc, Wis. The first is GRILLIN TYPE SD-10, item #88010D, which contains maltodextrin, grill flavor (from vegetable oil), modified food starch, corn syrup solids, and less that two percent tricalcium phosphate as an anti-caking agent. As an alternative, GRILLIN TYPE GB, item #570130, may be used; GRILLIN TYPE GB contains maltodextrin, salt, grill flavor, modified food starch, corn syrup solids, smoke flavoring, tri-calcium phosphate (anti-caking agent).

The first soy protein is a soy concentrate that may be purchased from Archer Daniels Midland under the trade name ARCON-T. The second soy protein is a soy isolate that may be purchased from Archer Daniels Midland under the trade name PRO FAM 646.

EXTENDED TACO FLAVORED BEEF

The following TABLE F lists ingredients that may be combined to obtain a sixth exemplary style of formulated meat mixture 26. This sixth exemplary style would be commonly referred to as an extended taco flavored beef.

TABLE F

| Ingredient | Preferred Embodiment | First Preferred Range | Second Preferred Range |
|---|---|---|---|
| Ground beef | 100 lbs. | 100 lbs. | 100 lbs. |
| spice blend | 6.0 lbs. | 5–7% | 4–8.0% |
| first soy protein | 3.5 lbs. | 2.5–4.5% | 1.5–5.5% |
| Water | 4 lbs. | 2.0–10.0% | 0.4–16% |
| Second soy protein | 1.0 lbs. | 0.5–2.5% | 0.1–4.0% |

The spice blend called out in TABLE F is available from the Heller Spice Co. as LENZ TACO SEASONING #3.

The first soy protein is a soy concentrate that may be purchased from Archer Daniels Midland under the trade name ARCON-T. The second soy protein is a soy isolate that may be purchased from Archer Daniels Midland under the trade name PRO FAM 646.

GRILL FLAVORED BEEF WITH SOY ISOLATE

The following TABLE G lists ingredients that may be combined to obtain a seventh exemplary style of formulated meat mixture 26. This seventh exemplary style would be commonly referred to as a grill flavored beef with soy isolate.

TABLE G

| Ingredient | Preferred Embodiment | First Preferred Range | Second Preferred Range |
|---|---|---|---|
| Ground beef | 100 lbs. | 100 lbs. | 100 lbs. |
| soy protein | 4.0 lbs. | 3.0–5.0% | 2.0–6.0% |

TABLE G-continued

| Ingredient | Preferred Embodiment | First Preferred Range | Second Preferred Range |
|---|---|---|---|
| encapsulated salt | 0.875 lbs. | 0.5–1% | 0–2% |
| spice blend | 0.06 lbs. | 0.01–0.15% | 0.005–0.50% |

The spice blend called out in TABLE G is one of two spice blends that can be used from Red Arrow Products Co. of Manitowoc, Wis. The first is GRILLIN TYPE SD-10, item #88010D, which contains maltodextrin, grill flavor (from vegetable oil), modified food starch, corn syrup solids, and less that two percent tricalcium phosphate as an anti-caking agent. As an alternative, GRILLIN TYPE GB, item #570130, may be used; GRILLIN TYPE GB contains maltodextrin, salt, grill flavor, modified food starch, corn syrup solids, smoke flavoring, tri-calcium phosphate (anti-caking agent).

The soy protein is a soy isolate that may be purchased from Archer Daniels Midland under the trade name PRO FAM 646.

TACO FLAVORED BEEF WITH SOY ISOLATE

The following TABLE H lists ingredients that may be combined to obtain an eighth exemplary style of formulated meat mixture 26. This eighth exemplary style would be commonly referred to as a taco flavored beef with soy isolate.

TABLE H

| Ingredient | Preferred Embodiment | First Preferred Range | Second Preferred Range |
|---|---|---|---|
| ground beef | 100 lbs. | 100 lbs. | 100 lbs. |
| soy protein | 2.5 lbs. | 2.0–4.0% | 1.0–5.0% |
| spice blend | 6.0 lbs. | 5.0–7.0% | 4.0–8.0% |

The spice blend called out in TABLE H is procured from the Heller Spice Co. as LENZ TACO SEASONING #3.

The soy protein is a soy isolate that may be purchased from Archer Daniels Midland under the trade name PRO FAM 646.

GRILL FLAVORED TURKEY WITH SOY ISOLATE

The following TABLE I lists ingredients that may be combined to obtain a ninth exemplary style of formulated meat mixture 26. This ninth exemplary style would be commonly referred to as a grill flavored turkey with soy isolate.

TABLE I

| Ingredient | Preferred Embodiment | First Preferred Range | Second Preferred Range |
|---|---|---|---|
| Ground turkey | 100 lbs. | 100 lbs. | 100 lbs. |
| soy protein | 4.0 lbs. | 3.0–5.0% | 2.0–6.0% |

TABLE I-continued

| Ingredient | Preferred Embodiment | First Preferred Range | Second Preferred Range |
|---|---|---|---|
| Encapsulated salt | 0.875 lbs. | 0.375–1.375% | |
| spice blend | 0.06 lbs. | 0.01–0.15% | 0.005–0.50% |

The spice blend called out in TABLE I is one of two spice blends that can be used from Red Arrow Products Co. of Manitowoc, Wis. The first is GRILLIN TYPE SD-10, item #88010D, which contains maltodextrin, grill flavor (from vegetable oil), modified food starch, corn syrup solids, and less that two percent tricalcium phosphate as an anti-caking agent.

As an alternative, GRILLIN TYPE GC, item #590120, may be used as the spice blend. GRILLIN TYPE GC contains maltodextrin, salt, corn flour, grill flavor, corn syrup solids, modified food starch, smoke flavoring, tricalcium phosphate (anti-caking agent).

The soy protein is a soy isolate that may be purchased from Archer Daniels Midland under the trade name PRO FAM 646.

TACO FLAVORED TURKEY WITH SOY ISOLATE

The following TABLE J lists ingredients that may be combined to obtain a tenth exemplary style of formulated meat mixture 26. This tenth exemplary style would be commonly referred to as taco flavored turkey with soy isolate.

TABLE J

| Ingredient | Preferred Embodiment | First Preferred Range | Second Preferred Range |
|---|---|---|---|
| ground turkey | 100 lbs. | 100 lbs. | 100 lbs. |
| soy protein | 2.5 lbs. | 1.5–3.5% | 0.5–5.0% |
| spice blend | 6.0 lbs. | 5–7% | 4–8.0% |

The spice blend called out in TABLE J is procured from the Heller Spice Co. as LENZ TACO SEASONING #3.

The soy protein is a soy isolate that may be purchased from Archer Daniels Midland under the trade name PRO FAM 646.

SMOKE FLAVORED BEEF PATTY

The following TABLE K lists ingredients that may be combined to obtain an eleventh exemplary style of formulated meat mixture 26. This eleventh exemplary style would be commonly referred to as smoke flavored beef patty. This style is optimized for use as a patty that is eaten whole in a bun rather than broken apart as an ingredient.

TABLE K

| Ingredient | Preferred Embodiment | First Preferred Range | Second Preferred Range |
|---|---|---|---|
| ground beef | 100 lbs. | 100 lbs. | 100 lbs. |
| first soy protein | 5.5 lbs. | 3.5–7.5% | 2.5–9.0% |
| first spice blend | 0.10 lbs. | 0.01–0.15% | 0.005–0.50% |
| second spice blend | 0.02 lbs. | 0–0.05% | 0–0.1% |

TABLE K-continued

| Ingredient | Preferred Embodiment | First Preferred Range | Second Preferred Range |
|---|---|---|---|
| second soy protein | 1 lbs. | 0.5–1.5% | <2.0% |
| encapsulated salt | 0.875 lbs. | 0.375–1.375% | <2.0% |

The first spice blend is a dry spice blend available from Red Arrow Products Co. of Manitowoc, Wis. as GRILLIN TYPE GB, item#570130, available from Red Arrow Products Co. of Manitowoc, Wis. GRILLIN TYPE GB contains maltodextrin, salt, grill flavor, modified food starch, corn syrup solids, smoke flavoring, and tricalcium phosphate (anti-caking agent).

The second spice blend is a liquid spice product available from Red Arrow Products Co. of Manitowoc, Wis. as GRILLIN TYPE CN, item No. 870120. GRILLIN TYPE CN contains grill flavor and natural hickory smoke flavoring.

The first soy protein is a soy concentrate that may be purchased from Archer Daniels Midland under the trade name ARCON-T. The second soy protein is a soy isolate that may be purchased from Archer Daniels Midland under the trade name PRO FAM 646.

REGULAR FLAVOR BEEF

The following TABLE L lists ingredients that may be combined to obtain yet another exemplary style of formulated meat mixture 26. This exemplary style would be commonly referred to as a regular flavor beef.

TABLE L

| Ingredient | Preferred Embodiment | First Preferred Range | Second Preferred Range |
|---|---|---|---|
| ground beef | 100 lbs. | 100 lbs. | 100 lbs. |
| soy protein | 5.5 lbs | 5–6% | 3.5–7.5% |
| encapsulated salt | 0.875 lbs. | 0.5–1% | 0–2% |

The soy protein is a soy concentrate that may be purchased from Archer Daniels Midland under the trade name ARCON-T or alternately ARCON-S.

EXTENDED REGULAR FLAVOR BEEF

The following TABLE M lists ingredients that may be combined to obtain another exemplary style of formulated meat mixture 26. This exemplary style would be commonly referred to as an extended regular flavor beef.

TABLE M

| Ingredient | Preferred Embodiment | First Preferred Range | Second Preferred Range |
|---|---|---|---|
| ground beef | 100 lbs. | 100 lbs. | 100 lbs. |
| first soy protein | 5.5 lbs. | 4.5–6.5% | 3.5–7.5% |
| water | 4 lbs. | 2.0–10.0% | 0.4–16.0% |

TABLE M-continued

| Ingredient | Preferred Embodiment | First Preferred Range | Second Preferred Range |
|---|---|---|---|
| second soy protein | 1.0 lbs. | 0.5–2.5% | 0.1–4.0% |
| encapsulated salt | .875 lbs. | 0.375–1.375% | <2.0% |

The first soy protein is a soy concentrate that may be purchased from Archer Daniels Midland under the trade name ARCON-T. The second soy protein is a soy isolate that may be purchased from Archer Daniels Midland under the trade name PRO FAM 646.

REGULAR FLAVOR BEEF WITH SOY ISOLATE

The following TABLE N lists ingredients that may be combined to obtain another exemplary style of formulated meat mixture 26. This exemplary style would be commonly referred to as a regular flavor beef with soy isolate.

TABLE N

| Ingredient | Preferred Embodiment | First Preferred Range | Second Preferred Range |
|---|---|---|---|
| ground beef | 100 lbs. | 100 lbs. | 100 lbs. |
| soy protein | 4.0 lbs. | 3.0–5.0% | 2.0–6.0% |
| encapsulated salt | 0.875 lbs. | 0.5–1% | 0–2% |

The soy protein is a soy isolate that may be purchased from Archer Daniels Midland under the trade name PRO FAM 646.

REGULAR FLAVOR TURKEY

The following TABLE O lists ingredients that may be combined to obtain another exemplary style of formulated meat mixture 26. This exemplary style would be commonly referred to as a regular flavor turkey.

TABLE O

| Ingredient | Preferred Embodiment | First Preferred Range | Second Preferred Range |
|---|---|---|---|
| ground turkey | 100 lbs. | 100 lbs. | 100 lbs. |
| soy protein | 5.5 lbs. | 4.5–6.5% | 3.5–7.5% |
| encapsulated salt | 0.875 lbs. | 0.375–1.375% | 0–2% |

The soy protein is a soy concentrate that may be purchased from Archer Daniels Midland under the trade name ARCON-T or alternately ARCON-S.

REGULAR FLAVOR TURKEY WITH SOY ISOLATE

The following TABLE P lists ingredients that may be combined to obtain another exemplary style of formulated meat mixture 26. This exemplary style would be commonly referred to as regular flavor turkey with soy isolate.

TABLE P

| Ingredient | Preferred Embodiment | First Preferred Range | Second Preferred Range |
|---|---|---|---|
| ground turkey | 100 lbs. | 100 lbs. | 100 lbs. |
| soy protein | 4.0 lbs. | 3.0–5.0% | 2.0–6.0% |
| encapsulated salt | 0.875 lbs. | 0.375–1.375% | <2.0% |

The soy protein is a soy isolate that may be purchased from Archer Daniels Midland under the trade name PRO FAM 646.

EXTENDED REGULAR FLAVOR TURKEY

The following TABLE Q lists ingredients that may be combined to obtain another exemplary style of formulated meat mixture 26. This exemplary style would be commonly referred to as extended regular flavor turkey.

TABLE Q

| Ingredient | Preferred Embodiment | First Preferred Range | Second Preferred Range |
|---|---|---|---|
| ground turkey | 100 lbs. | 100 lbs. | 100 lbs. |
| first soy protein | 5.5 lbs. | 4.5–6.5% | 3.5–7.5% |
| water | 4 lbs. | 2.0–10.0% | 0.4–16.0% |
| second soy protein | 1.0 lbs. | 0.5–2.5% | 0.1–4.0% |
| encapsulated salt | .875 lbs. | 0.375–1.375% | <2.0% |

The first soy protein is a soy concentrate that may be purchased from Archer Daniels Midland under the trade name ARCON-T. The second soy protein is a soy isolate that may be purchased from Archer Daniels Midland under the trade name PRO FAM 646.

F. Other Parameters

In the foregoing description, certain physical parameters of the perforated ground meat portions were identified. The following tables contain numerical values for these parameters for perforated ground meat portions appropriate for sale through retail and institutional channels.

These parameters are set forth in tables that describe the parameter in the first column, a preferred embodiment in the second column, and first and second preferred ranges in the third and fourth columns.

RETAIL PORTION

The dimensions of the preferred retail portion described in the following TABLE R yield a portion of ground meat 24 that is appropriate for use in recipes suitable for preparation in the home.

TABLE R

| Parameter | Preferred Embodiment | First Preferred Range | Second Preferred Range |
|---|---|---|---|
| Thickness "t" | 0.536" | 0.25–0.75" | 0.25–1.0" |
| depth "d" | 1/16" | 1/16–1/8" | 1/32–1/4" |
| cross-sectional area "c" | 0.01 square inches | 0.005–0.05 square inches | 0.001–0.1 square inches |
| density "p" in perforations per square inch | Approx. 7.5 | 5–11 | 4–15 |
| length "l" | 7.51" | 3.0–9.0" | 3.0–12.0" |
| width "w" | 4.875" | 3.0–6.0" | 3.0–10.0" |
| radius "r" | 0.5" | 0.25–1.0" | 0–1.5" |

INSTITUTIONAL PORTION

The dimensions of the preferred institutional portion described in the following TABLE S yield a portion of ground meat 24 that is appropriate for use in recipes yielding portions suitable for institutional food preparation.

TABLE S

| Parameter | Preferred Embodiment | First Preferred Range | Second Preferred Range |
|---|---|---|---|
| Thickness "t" | 0.536" | 0.25–0.75" | 0.25–1.0" |
| depth "d" | 1/16" | 1/16–1/8" | 1/32–1/4" |
| cross-sectional area "c" | 0.01 square inches | 0.005–0.05 square inches | 0.001–0.1 square inches |
| density "p" in perforations per square inch | Approx. 7.5 | 5–10 | 4–15 |
| Length "l" | 7.5" | 3.0–12.0" | 3.0–16.0" |
| Width "w" | 4.875" | 3.0–12.0" | 3.0–16.0" |
| Radius "r" | 0.5" | 0.25–1.0" | 0–1.5" |

STANDARD FILL PORTION

The dimensions of the preferred standard fill portion described in the following TABLE T yield a portion of ground meat 24 that can be formed using the standard fill process described above yet still be broken apart into acceptable sub-portions of ground meat.

TABLE T

| Parameter | Preferred Embodiment | First Preferred Range | Second Preferred Range |
|---|---|---|---|
| Thickness "t" | 0.500" | 0.25–0.60" | 0.10–0.6" |
| Depth "d" | 1/16" | 1/16–1/8" | 1/32–1/4" |
| Cross-sectional area "c" | 0.01 square inches | 0.005–0.05 square inches | 0.001–0.1 square inches |
| Density "p" in perforations per square inch | Approx. 7.5 | 5–10 | 4–15 |
| Length "l" | 7.5" | 3.0–9.0" | 3.0–12.0" |
| Width "w" | 4.875" | 3.0–6.0" | 3.0–10.0" |
| Radius "r" | 0.5" | 0.25–1.0" | 0–1.5" |

LENZ TACO SEASONING FORMULATION

The LENZ TACO SEASONING #3 discussed above is a custom blend of spices as set forth in the following Tables U or V.

TABLE U

| Parameter | Preferred Embodiment | First Preferred Range | Second Preferred Range |
|---|---|---|---|
| Encapsulated salt | 29.5% | 25–35% | 20–40% |
| Spices | 29.0% | 25–35% | 25–40% |
| Paprika | 17.0% | 10–20% | 0–20% |
| Sugar | 12.0% | 10–15% | 8–15% |
| Onion powder and garlic powder | 9.5% | 8–12% | 6–15% |
| Citric Acid | 1.5% | 1–2% | 0–3% |
| Soybean oil and silica gel as an anti-caking agent | <2.0% | <2.0% | <2.0% |

TABLE V

| Parameter | Preferred Embodiment | First Preferred Range | Second Preferred Range |
|---|---|---|---|
| Non-encapsulated salt | 23.5% | 20–25% | 15–30% |
| Spices | 33.0% | 30–35% | 25–40% |
| Paprika | 17.5% | 10–20% | 0–20% |
| Sugar | 13.0% | 10–15% | 8–17% |
| Onion powder and garlic powder | 10% | 8–12% | 6–15% |
| Citric Acid | 1.5% | 1–2% | 0–3% |
| Soybean oil and silica gel as an anti-caking agent | <2.0% | <2.0% | <2.0% |

From the foregoing, it should be apparent that the present invention may be embodied in forms other than those described above. The scope of the present invention should thus be determined by reference to the claims appended hereto and not the foregoing detailed description.

I claim:

1. A cooked ground meat product comprising:
    a food portion comprising ground meat and at least one moisture absorbing additive, where the food portion comprises
        a structure comprising a plurality of elongate sub-portions arranged such that each of the sub-portions define first and second face surfaces and an outermost portion of the sub-portions defining an edge surface, where the first and second face surfaces are generally parallel to each other and the edge surface extends between the first and second face surfaces,
        a thickness dimension extending between the first and second face surfaces, and
        a plurality of cavities formed in the first and second face surfaces, the cavities having at least one physical characteristic; and
    a packaging portion comprising a first film sheet and a second film sheet, the first and second film sheets being attached to each other such that they form an envelope in which the food portion is vacuum sealed; wherein
    the food portion is cooked within the envelope and a portion of any fluids discharged from the food portion during cooking are absorbed by the moisture absorbing additive;
    when the food portion is contained within or removed from the envelope, the food portion may be broken apart to form cooked ground meat; and
    the physical characteristics of the cavities are predetermined such that
        a portion of the fluids discharged from the food portion during cooking that are not absorbed by the moisture absorbing additive collect in the cavities, and
        the structure of the food portion is altered by the cavities in a manner that does not materially interfere with the breaking apart of the food portion into cooked ground meat.

2. A product as recited in claim 1, in which the physical characteristics of the cavities include at least one of cross-sectional area, density, and depth dimension.

3. A product as recited in claim 1, in which the moisture absorbing additive is soy protein.

4. A product as recited in claim 3, in which the soy protein is in the form of at least one the group consisting of soy flour, soy concentrate, and soy isolate.

5. A product as recited in claim 4, in which the ground meat consists of one of ground beef, ground turkey, and a combination thereof.

6. A product as recited in claim 5, in which the food portion further comprises substantially between 3.5% and 7.5% of soy protein concentrate as a percentage by weight of the ground meat, substantially between 0% and 2.0% of encapsulated salt as a percentage by weight of the ground meat, and substantially between 0% and 1.0% of prepared grill spice blend as a percentage by weight of the ground meat.

7. A product as recited in claim 5, in which the food portion further comprises substantially between 1.5% and 5.5% of soy protein concentrate as a percentage by weight of the ground meat and substantially between 4.0% and 8.0% of prepared taco spice blend as a percentage by weight of the ground meat.

8. A product as recited in claim 5, in which the food portion further comprises substantially between 3.5% and 7.5% of soy protein concentrate as a percentage by weight of the ground meat, substantially between 0% and 2.0% of encapsulated salt as a percentage by weight of the ground meat, substantially between 0.1% and 4% of a second soy protein concentrate as a percentage by weight of the ground meat, substantially between 0.4% and 16% of water as a percentage by weight of the ground meat, and substantially between 0 and 1.0% of prepared grill spice blend as a percentage by weight of the ground meat.

9. A product as recited in claim 5, in which the food portion further comprises substantially between 1.5% and 5.5% of a first soy protein concentrate as a percentage by weight of the ground meat, substantially between 0.1% and 4% of a second soy protein concentrate as a percentage by weight of the ground meat, substantially between 0.4% and 16% of water as a percentage by weight of the ground meat, and substantially between 4.0% and 8.0% of prepared taco spice blend as a percentage by weight of the ground meat.

10. A product as recited in claim 1, in which the food portion further comprises at least one of flavoring additives, fillers, and encapsulated salt.

11. A method of forming a cooked ground meat product comprising the steps of:
    mixing raw ground meat wth at least one moisture absorbing additive to obtain formulated meat mixture;
    shaping the formulated meat mixture into a ground meat portion defining a structure comprising a plurality of elongate sub-portions arranged such that each of the sub-portions define first and second face surfaces and an outermost portion of the sub-portions defining and an edge surface, where the first and second face surfaces are generally parallel to each other and the edge surface extends between the first and second face surfaces, and the ground meat portion has a thickness dimension extending between the first and second face surfaces;

forming a plurality of cavities in the first and second face surfaces to obtain a perforated ground meat portion, where the cavities have at least one physical characteristic;

sealing the perforated ground meat within an envelope to obtain a vacuum-packaged, perforated, ground meat portion;

applying heat to the packaged, perforated, ground meat portion to obtain a tenderized, cooked, packaged, perforated, ground meat portion, where a portion of any moisture discharged from the package, perforated, ground meat portion during heating is absorbed by the moisture absorbing additive and a portion of the remaining moisture discharged from the packaged, perforated, ground meat portion during heating collects within the plurality of cavities; and breaking apart the tenderized cooked ground meat portion to obtain cooked ground meat.

12. A method as recited in claim 11, in which the step of sealing the perforated ground meat portion within the envelope comprises the step of maintaining the perforated ground meat portion in at least a partially frozen state.

13. A method as recited in claim 11, in which the step of applying heat to the packaged, perforated, ground meat portion comprises the step of cooking the packaged, perforated, ground meat portion with at least one of steam and hot water.

14. A method as recited in claim 11, in which the step of applying heat to the packaged, perforated, ground meat portion comprises the step of applying heat until the internal temperature of the packaged, perforated, ground meat portion is substantially between 160° F. and 180° F.

15. A method as recited in claim 11, in which the step of applying heat to the packaged, perforated, ground meat portion comprises the step of maintaining the packaged, perforated, ground meat portion in a frozen state until the heat is applied thereto.

16. A method as recited in claim 11, in which the physical characteristics of the cavities include at least one of the group consisting of depth, cross-sectional area, and density.

17. A method as recited in claim 11, further comprising the steps of shaping the ground meat portion such that it has a thickness of substantially between 0.25" and 1.0", a length of substantially between 3.0" and 12.0", and a width of substantially between 3.0" and 10.0".

18. A method as recited in claim 11, further comprising the steps of shaping the ground meat portion such that it has a thickness of substantially between 0.25" and 1.0", a length of substantially between 3.0" and 16.0", and a width of substantially between 3.0" and 16.0".

19. A method as recited in claim 11, further comprising the step of establishing at least a partial vacuum within the envelope before the perforated ground meat portion is sealed within the envelope.

20. A method of forming a cooked ground meat product comprising the steps of:

mixing semi-frozen raw ground meat with at least one moisture absorbing additive to obtain formulated meat mixture;

shaping the formulated meat mixture into a frozen ground meat portion having a structure comprising a plurality of sub-portions arranged such that each of the sub-portions define first and second face surfaces of the ground meat portion and an outermost portion of the sides of the sub-portions defining an edge surface of the ground meat portion, where
the first and second face surfaces are generally parallel to each other and the edge surface extends between the first and second face surfaces, and
the ground meat portion has a thickness dimension extending between the first and second face surfaces;

forming a plurality of cavities in the first and second face surfaces to obtain a perforated ground meat portion, where the cavities have at least one physical characteristic;

freezing the mixed ground meat portion;

placing the frozen, mixed ground meat portion between first and second sheets;

forming a vacuum-packaged, perforated, frozen ground meat portion by removing ambient air from between the first and second sheets and sealing the first and second sheets together to form an envelope;

applying heat to the vacuum-packaged, perforated, frozen ground meat portion, until the internal temperature of the packaged, perforated, ground meat portion is substantially between 160° F. and 180° F., to obtain a cooked, packaged, perforated, ground meat portion, where a portion of any moisture discharged from the packaged, perforated, ground meat portion during heating is absorbed by the moisture absorbing additive and a portion of the remaining moisture discharged from the packaged, perforated, ground meat portion during heating collects within the plurality of cavities; and breaking apart the cooked ground meat portion to obtain cooked ground meat; wherein the physical characteristics of the cavities in the first and second face surfaces are predetermined such that the cavities alter the grain structure of the ground meat portion in a manner that does not materially interfere with the breaking apart of the cooked ground meat portion to obtain cooked ground meat.

21. A method as recited in claim 20, in which the physical characteristics of the cavities include at least one of the group consisting of depth, cross-sectional area, and density.

22. A method of forming a cooked ground meat product comprising the steps of:

mixing raw ground meat wth at least one moisture absorbing additive to obtain formulated meat mixture;

shaping the formulated meat mixture into a ground meat portion having a structure defining a plurality of elongate sub-portions arranged such that each of the sub-portions define first and second face surfaces and an outermost portion of the sub-portions defining and an edge surface, where the first and second face surfaces are generally parallel to each other and the edge surface extends between the first and second face surfaces, and the ground meat portion has a thickness dimension extending between the first and second face surfaces;

forming a plurality of cavities in the first and second face surfaces to obtain a perforated ground meat portion, where the cavities have at least one physical characteristic;

sealing the perforated ground meat within an envelope to obtain a vacuum-packaged, perforated, ground meat portion;

applying heat to the packaged, perforated, ground meat portion to obtain a cooked, packaged, perforated, ground meat portion, where a portion of any moisture discharged from the packaged, perforated, ground meat portion during heating is absorbed by the moisture absorbing additive and a portion of the remaining moisture discharged from the packaged, perforated, ground meat portion during heating collects within the plurality of cavities; and tenderizing the package, perforated, cooked, ground meat portion to mix at least one of air and moisture within the package into the ground meat portion.

23. A method as recited in claim 22, in which the step of shaping the formulated meat into a ground meat portion comprises the step of arranging a plurality of elongate sub-portions such that ends of the sub-portions define the first and second face surfaces and a portion of the outermost sub-portions define the edge surface.

24. A method as recited in claim 22, further comprising the step of forming a plurality of cavities in the first and second face surfaces to obtain a perforated ground meat portion.

25. A method of forming a cooked ground meat product comprising the steps of:

mixing raw ground meat with at least one moisture absorbing additive to obtain formulated meat mixture;

shaping the formulated meat mixture into a ground meat portion having a structure defining first and second face surfaces and an edge surface, where the first and second face surfaces are generally parallel to each other and the edge surface extends between the first and second face surfaces, the ground meat portion has a thickness dimension extending between the first and second face surfaces, and the ground meat portion comprises a plurality of elongate sub-portions arranged such that each of the ends of the sub-portions define the first and second face surfaces and an outermost portion of the sub-portions defining the edge surface;

sealing the ground meat portion within an envelope to obtain a vacuum-packaged, ground meat portion;

applying heat to the packaged, ground meat portion to obtain a cooked, packaged ground meat portion, where a portion of any moisture discharged from the packaged ground meat portion during heating is absorbed by the moisture absorbing additive; and breaking apart the tenderized cooked ground meat portion to obtain cooked ground meat.

26. A method as recited in claim 25, further comprising the step of forming a plurality of cavities in the first and second face surfaces to obtain a perforated ground meat portion.

27. A method as recited in claim 25, further comprising the step of tenderizing the packaged, cooked, ground meat portion to mix at least one of air and moisture within the package into the ground meat portion.

28. A method as recited in claim 11, in which the step of shaping the formulated meat into a ground meat portion comprises the step of arranging a plurality of elongate sub-portions such that ends of the sub-portions define the first and second face surfaces and a portion of the outermost sub-portions define the edge surface.

29. A method as recited in claim 11, further comprising the step of tenderizing the packaged, cooked, ground meat portion to mix at least one of air and moisture within the package into the ground meat portion.

* * * * *